United States Patent
Sasaki et al.

(10) Patent No.: US 10,586,558 B1
(45) Date of Patent: Mar. 10, 2020

(54) MAGNETIC HEAD INCLUDING A MAIN POLE AND A WRITE SHIELD

(71) Applicants: Yoshitaka Sasaki, Los Gatos, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Atsushi Yamaguchi, Milpitas, CA (US); Kei Hirata, Milpitas, CA (US)

(72) Inventors: Yoshitaka Sasaki, Los Gatos, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Atsushi Yamaguchi, Milpitas, CA (US); Kei Hirata, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 16/267,803

(22) Filed: Feb. 5, 2019

(51) Int. Cl.
G11B 5/31 (2006.01)
G11B 5/11 (2006.01)
G11B 5/127 (2006.01)
G11B 5/02 (2006.01)

(52) U.S. Cl.
CPC ............ *G11B 5/11* (2013.01); *G11B 5/02* (2013.01); *G11B 5/1272* (2013.01); *G11B 5/1278* (2013.01); *G11B 5/313* (2013.01); *G11B 5/315* (2013.01); *G11B 5/3116* (2013.01); *G11B 5/3146* (2013.01); *G11B 5/3163* (2013.01)

(58) Field of Classification Search
CPC ...... G11B 5/1278; G11B 5/313; G11B 5/3146; G11B 5/315
USPC .............. 360/125.13, 125.14, 125.15, 125.3
See application file for complete search history.

(56) References Cited

U.S. PATENT DOCUMENTS

| | | | |
|---|---|---|---|
| 8,767,347 B1* | 7/2014 | Sasaki | G11B 5/315 |
| | | | 360/123.06 |
| 9,251,812 B2* | 2/2016 | Sasaki | G11B 5/3163 |
| 9,336,798 B1* | 5/2016 | Sasaki | G11B 5/315 |
| 9,361,912 B1* | 6/2016 | Liu | G11B 5/187 |
| 9,406,318 B2* | 8/2016 | Sasaki | G11B 5/1272 |
| 9,741,370 B2* | 8/2017 | Sasaki | G11B 5/3116 |
| 9,824,700 B1* | 11/2017 | Aritomo | G11B 5/112 |
| 9,990,942 B1* | 6/2018 | Liu | G11B 5/3163 |
| 10,026,422 B1* | 7/2018 | Basu | G11B 5/3116 |
| 10,311,899 B2* | 6/2019 | Liu | G11B 5/3116 |
| 10,403,311 B1* | 9/2019 | Basu | G11B 5/1278 |
| 10,468,054 B1* | 11/2019 | Shin | C23C 16/06 |

(Continued)

*Primary Examiner* — Jefferson A Evans
(74) *Attorney, Agent, or Firm* — Oliff PLC

(57) ABSTRACT

A magnetic head includes a main pole and a write shield. The write shield includes a bottom shield, a first side shield and a second side shield. The first side shield has first and second sidewalls. The second side shield has third and fourth sidewalls. Each of the second and fourth sidewalls has a top edge farthest from a top surface of a substrate. The top edge of each of the second and fourth sidewalls is parallel to a medium facing surface. A portion of a top surface of the bottom shield, the first sidewall, and the third sidewall define a receiving section to receive a portion of the main pole. The receiving section has a bottom including a first inclined portion, a second inclined portion, and a third inclined portion.

12 Claims, 22 Drawing Sheets

(56) References Cited

U.S. PATENT DOCUMENTS

2016/0055869 A1* 2/2016 Sasaki .................. G11B 5/1272
360/319

* cited by examiner

MAGNETIC HEAD INCLUDING A MAIN POLE AND A WRITE SHIELD

BACKGROUND OF THE INVENTION

1. Field of the Invention

The present invention relates to a magnetic head for use to write data on a recording medium, and more specifically, to a magnetic head including a main pole and a write shield.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a top surface of a substrate. The write head unit includes a main pole configured to produce a write magnetic field in the direction perpendicular to the plane of a recording medium. The main pole has an end face that is located in a medium facing surface configured to face the recording medium.

In a magnetic head for use in a magnetic disk drive of the perpendicular magnetic recording system, from the viewpoint of increasing the recording density, the end face of the main pole located in the medium facing surface is preferably smaller in width. On the other hand, from the viewpoint of improving the write characteristics of the write head unit, e.g., overwrite property which represents the overwriting capability, the main pole preferably has a larger cross-sectional area in the vicinity of the medium facing surface.

A magnetic disk drive of the perpendicular magnetic recording system may sometimes exhibit a phenomenon in which signals already written on one or more tracks in the neighborhood of a track targeted for writing are erased or attenuated during writing of a signal on the track targeted for writing. In the present application, such a phenomenon will be referred to as unwanted erasure. Unwanted erasure includes adjacent track erasure (ATE) and wide-area track erasure (WATE). Achieving higher recording densities requires minimizing the occurrence of unwanted erasure.

Known techniques for minimizing the occurrence of unwanted erasure include the technique of providing a write shield, as disclosed in U.S. Pat. No. 9,336,798 B1 and U.S. Pat. No. 9,406,318 B2, for example. The write shield includes a bottom shield, a first side shield, and a second side shield. The bottom shield is located closer to the top surface of the substrate than the main pole. The first side shield and the second side shield are located on opposite sides of the main pole in the track width direction.

The first side shield has a first sidewall and a second sidewall, the first sidewall being closer to the medium facing surface than the second sidewall. The second side shield has a third sidewall and a fourth sidewall, the third sidewall being closer to the medium facing surface than the fourth sidewall. Each of the second and fourth sidewalls has an edge that is farthest from the top surface of the substrate and parallel to the medium facing surface. The main pole has a first to a fourth side surface. The first side surface is opposed to the first sidewall. Part of the second side surface is opposed to the second sidewall. The third side surface is opposed to the third sidewall. Part of the fourth side surface is opposed to the fourth sidewall.

In the magnetic head disclosed in each of U.S. Pat. Nos. 9,336,798 B1 and 9,406,318 B2, the distance from the edges of the second and fourth sidewalls to the medium facing surface will be referred to as side shield height. Reducing the side shield height in this magnetic head enables an increase in the cross-sectional area of the main pole in the vicinity of the medium facing surface, and as a result, enables an improvement in the write characteristics.

In the magnetic head disclosed in each of U.S. Pat. Nos. 9,336,798 B1 and 9,406,318 B2, the shape of the main pole depends on the shapes of the bottom shield and the first and second side shields. In order for this magnetic head to achieve improved write characteristics and higher recording density at the same time, it is important to optimize the shapes of the bottom shield and the first and second side shields. However, it has conventionally been difficult to optimize the shapes of the bottom shield and the first and second side shields.

SUMMARY OF THE INVENTION

It is an object of the present invention to provide a magnetic head including a main pole and a write shield and achieving improved write characteristics and higher recording density at the same time, and to provide a method of manufacturing such a magnetic head.

A magnetic head of the present invention and a magnetic head to be manufactured by a manufacturing method of the present invention include a medium facing surface configured to face a recording medium, a coil configured to produce a magnetic field corresponding to data to be written on the recording medium, a main pole configured to pass a magnetic flux corresponding to the magnetic field produced by the coil and to produce a write magnetic field for writing data on the recording medium, a write shield formed of a magnetic material, a gap section formed of a nonmagnetic material, and a substrate having a top surface. The coil, the main pole, the write shield, and the gap section are disposed above the top surface of the substrate.

The write shield includes a bottom shield, a first side shield, and a second side shield. The gap section is interposed between the main pole and each of the bottom shield, the first side shield and the second side shield. The bottom shield has a top surface farthest from the top surface of the substrate. The first and second side shields are located farther from the top surface of the substrate than the bottom shield, and are on opposite sides of the main pole in the track width direction.

The first side shield has a first front end face located in the medium facing surface, and a first sidewall and a second sidewall facing the main pole. The first sidewall is connected to the first front end face. The second sidewall is located farther from the medium facing surface than the first sidewall.

The second side shield has a second front end face located in the medium facing surface, and a third sidewall and a fourth sidewall facing the main pole. The third sidewall is connected to the second front end face. The fourth sidewall is located farther from the medium facing surface than the third sidewall. Each of the second and fourth sidewalls has a top edge farthest from the top surface of the substrate, and a bottom edge closest to the top surface of the substrate. The top edge of each of the second and fourth sidewalls is substantially parallel to the medium facing surface.

The bottom shield and the first and second side shields are configured so that a portion of the top surface of the bottom shield, the first sidewall, and the third sidewall define a receiving section to receive a portion of the main pole.

The main pole has an end face located in the medium facing surface, a top surface farthest from the top surface of the substrate, a bottom end opposite to the top surface, and a first, a second, a third and a fourth side surface. The first side surface is opposed to the first sidewall. A portion of the second side surface is opposed to the second sidewall. The third side surface is opposed to the third sidewall. A portion of the fourth side surface is opposed to the fourth sidewall.

The receiving section has a bottom which is constituted by the portion of the top surface of the bottom shield and opposed to a portion of the bottom end of the main pole.

In the magnetic head of the present invention, the bottom includes a first inclined portion, a second inclined portion, and a third inclined portion arranged in this order, the first inclined portion being closest to the medium facing surface. The second inclined portion is located closer to the top surface of the substrate than the first inclined portion. The third inclined portion is located closer to the top surface of the substrate than the second inclined portion. A distance from the top surface of the substrate to any point on each of the first and third inclined portions decreases with increasing distance from the point to the medium facing surface. The second inclined portion is inclined with respect to the first inclined portion such that an angle that the second inclined portion forms with respect to the top surface of the substrate is greater than an angle that the first inclined portion forms with the top surface of the substrate. The third inclined portion is inclined with respect to the second inclined portion such that an angle that the third inclined portion forms with respect to the top surface of the substrate is smaller than the angle that the second inclined portion forms with respect to the top surface of the substrate. The bottom end of the main pole includes a first portion opposed to the first inclined portion, a second portion opposed to the second inclined portion, and a third portion opposed to the third inclined portion.

In the magnetic head of the present invention, the first portion may be substantially parallel to the first inclined portion, the second portion may be substantially parallel to the second inclined portion, and the third portion may be substantially parallel to the third inclined portion.

In the magnetic head of the present invention, a distance from the bottom edge of each of the second and fourth sidewalls to the medium facing surface may be substantially equal to a distance from the boundary between the first and second inclined portions to the medium facing surface. In such a case, the distance from the bottom edge of each of the second and fourth sidewalls to the medium facing surface and the distance from the boundary between the first and second inclined portions to the medium facing surface may fall within the range of 10 to 60 nm.

In the magnetic head of the present invention, in any cross section intersecting the first and third sidewalls and parallel to the medium facing surface, a distance between the first sidewall and the third sidewall in the track width direction may decrease with increasing proximity to the top surface of the substrate. A distance between the first side surface and the third side surface in the track width direction may decrease with increasing proximity to the top surface of the substrate.

In the magnetic head manufactured by the manufacturing method of the present invention, the bottom includes a first inclined portion and a second inclined portion arranged in this order, the first inclined portion being closer to the medium facing surface. The second inclined portion is located closer to the top surface of the substrate than the first inclined portion. A distance from the top surface of the substrate to any point on the first inclined portion decreases with increasing distance from the point to the medium facing surface. The second inclined portion is inclined with respect to the first inclined portion such that an angle that the second inclined portion forms with respect to the top surface of the substrate is greater than an angle that the first inclined portion forms with respect to the top surface of the substrate. The bottom end of the main pole includes a first portion opposed to the first inclined portion, and a second portion opposed to the second inclined portion.

The manufacturing method for the magnetic head of the present invention includes: a step of forming an initial bottom shield having a top surface including the first inclined portion; a step of forming a first initial side shield and a second initial side shield on the initial bottom shield, the first initial side shield having the first sidewall, the second initial side shield having the third sidewall; a patterning step of patterning the first initial side shield, the second initial side shield and the initial bottom shield so as to provide the first initial side shield with the second sidewall, provide the second initial side shield with the fourth sidewall, and provide the top surface of the initial bottom shield with the second inclined portion; a step of forming the gap section after the patterning step; a step of forming an initial main pole after the step of forming the gap section; a step of forming the coil; and a step of forming the medium facing surface so that the initial bottom shield becomes the bottom shield, the first initial side shield becomes the first side shield, the second initial side shield becomes the second side shield, and the initial main pole becomes the main pole.

The patterning step includes a first etching step and a second etching step. The first etching step etches a portion of each of the first initial side shield and the second initial side shield so as to provide the first initial side shield with an initial second sidewall and provide the second initial side shield with an initial fourth sidewall.

The second etching step etches a portion of each of the first initial side shield, the second initial side shield and the initial bottom shield so as to make the initial second sidewall into the second sidewall, make the initial fourth sidewall into the fourth sidewall, and provide the top surface of the initial bottom shield with the second inclined portion.

In the magnetic head manufactured by the manufacturing method of the present invention, the bottom of the receiving section may further include a third inclined portion, the third inclined portion being located farther from the medium facing surface and closer to the top surface of the substrate than the second inclined portion. A distance from the top surface of the substrate to any point on the third inclined portion decreases with increasing distance from the point to the medium facing surface. The third inclined portion may be inclined with respect to the second inclined portion such that an angle that the third inclined portion forms with respect to the top surface of the substrate is smaller than the angle that the second inclined portion forms with respect to the top surface of the substrate. The bottom end of the main pole may further include a third portion opposed to the third inclined portion.

When the bottom of the receiving section includes the third inclined portion, the second etching step may etch the portion of the initial bottom shield so as to provide top surface of the initial bottom shield with the second and third inclined portions.

In the manufacturing method for the magnetic head of the present invention, the patterning step may further include a step of forming a planarization layer before the first etching step, the planarization layer covering a stack of layers including the first and second initial side shields, and a step of forming a mask on the planarization layer after the step of forming the planarization layer and before the first etching step. In such a case, the first etching step may etch a portion of the planarization layer as well as the portion of each of the first initial side shield and the second initial side shield using the mask.

In the manufacturing method for the magnetic head of the present invention, the patterning step may further include a step of forming a mask on the first and second initial side shields before the first etching step. In such a case, the first etching step may etch the portion of each of the first initial side shield and the second initial side shield using the mask.

In the manufacturing method for the magnetic head of the present invention, the first etching step may be performed by reactive ion etching. The second etching step may be performed by ion beam etching. In such a case, the ion beam etching may be performed such that ion beams are projected onto the initial second sidewall and the initial fourth sidewall.

The magnetic head and its manufacturing method of the present invention make it possible to reduce the width of the end face of the main pole located in the medium facing surface and increase the cross-sectional area of the main pole in the vicinity of the medium facing surface. The manufacturing method for the magnetic head of the present invention further makes it possible to achieve at the same time a reduction in side shield height and accurate definition of the first to fourth sidewalls. Thus, according to the present invention, improved write characteristics and higher recording density are achieved at the same time by the magnetic head including the main pole and the write shield.

Other objects, features and advantages of the present invention will become fully apparent from the following description.

DETAILED DESCRIPTION OF THE PREFERRED EMBODIMENTS

First Embodiment

Figure 6:
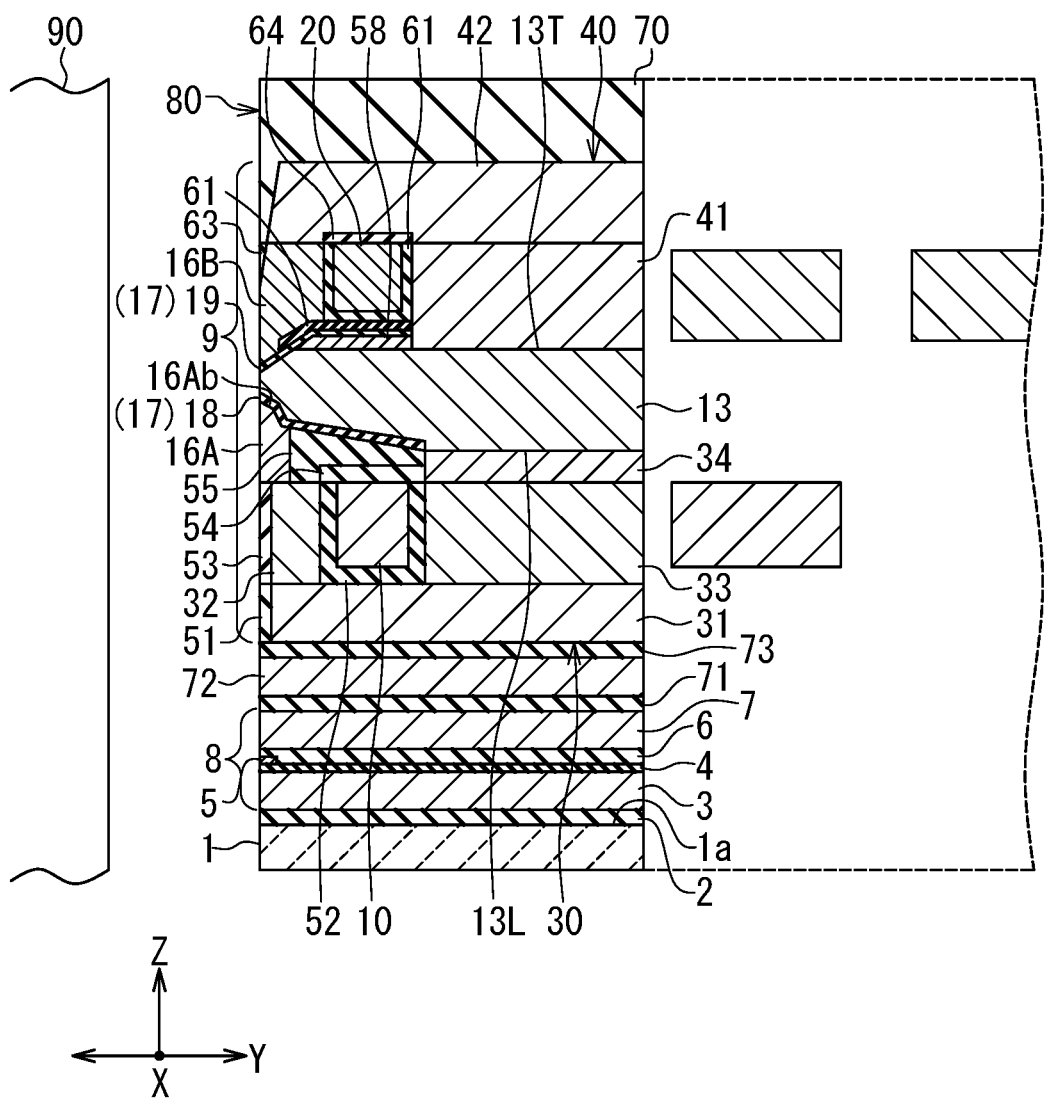
FIG. 6 is a cross-sectional view of the magnetic head according to the first embodiment of the invention.
Figure 7:
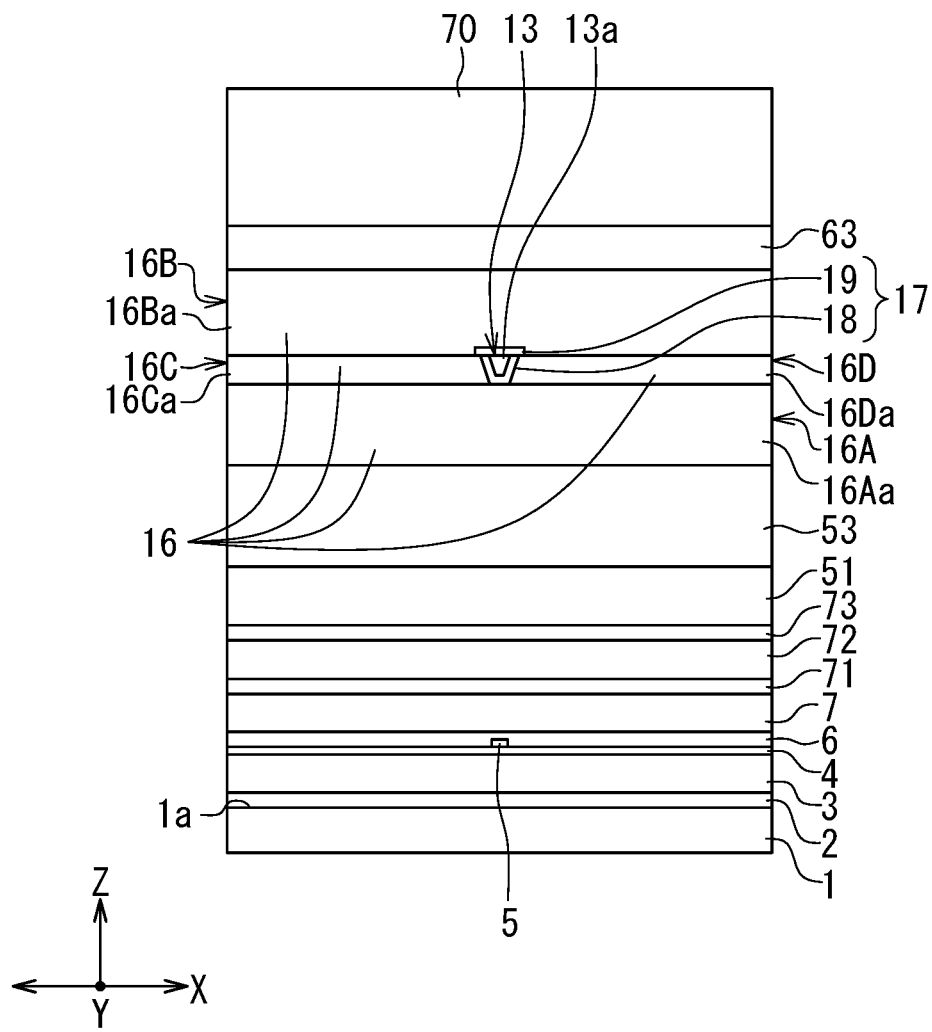
FIG. 7 is a front view showing the medium facing surface of the magnetic head according to the first embodiment of the invention.
Figure 8:
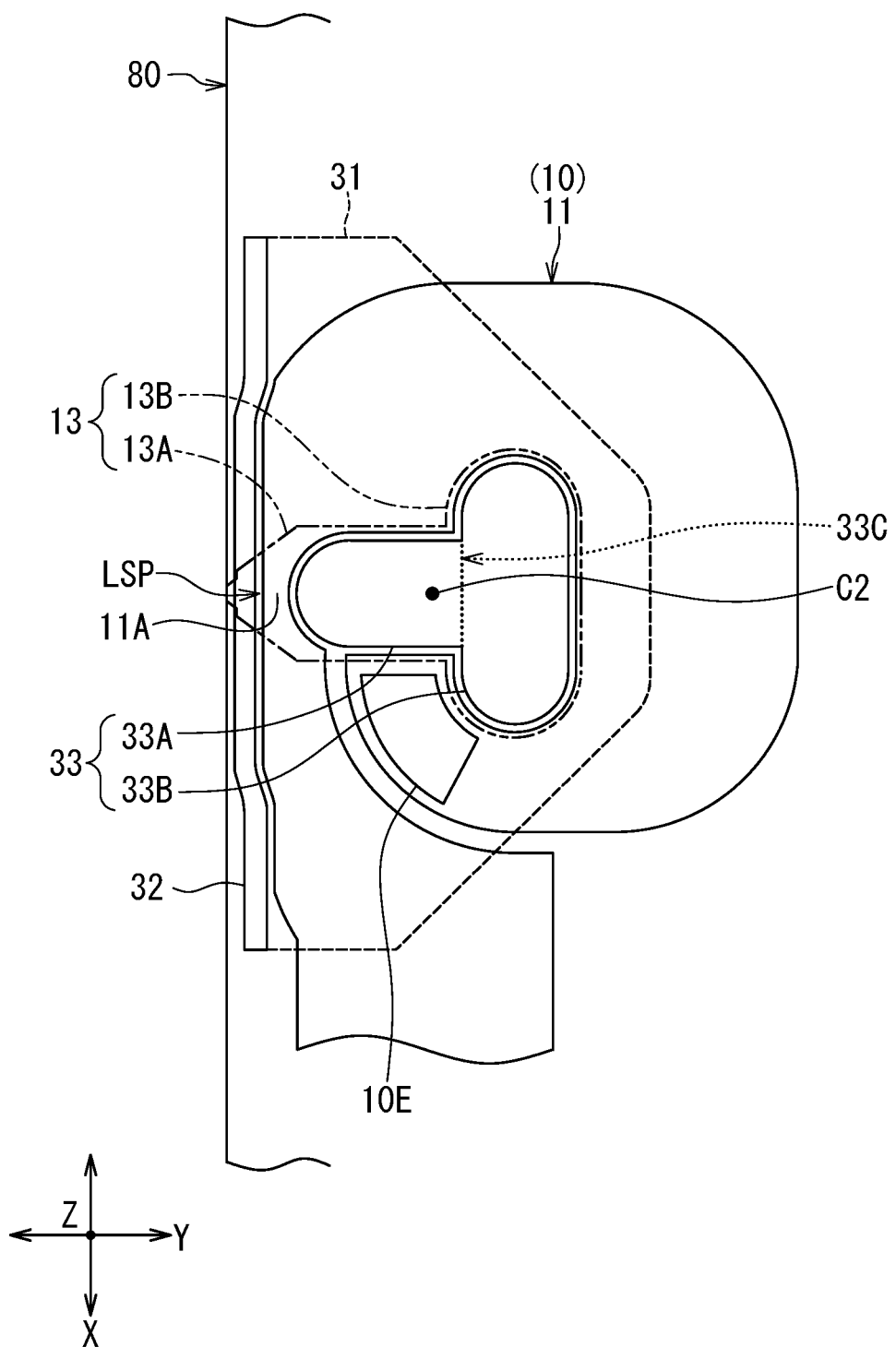
FIG. 8 is a plan view showing a lower coil portion and a lower core section of the magnetic head according to the first embodiment of the invention.
Figure 9:
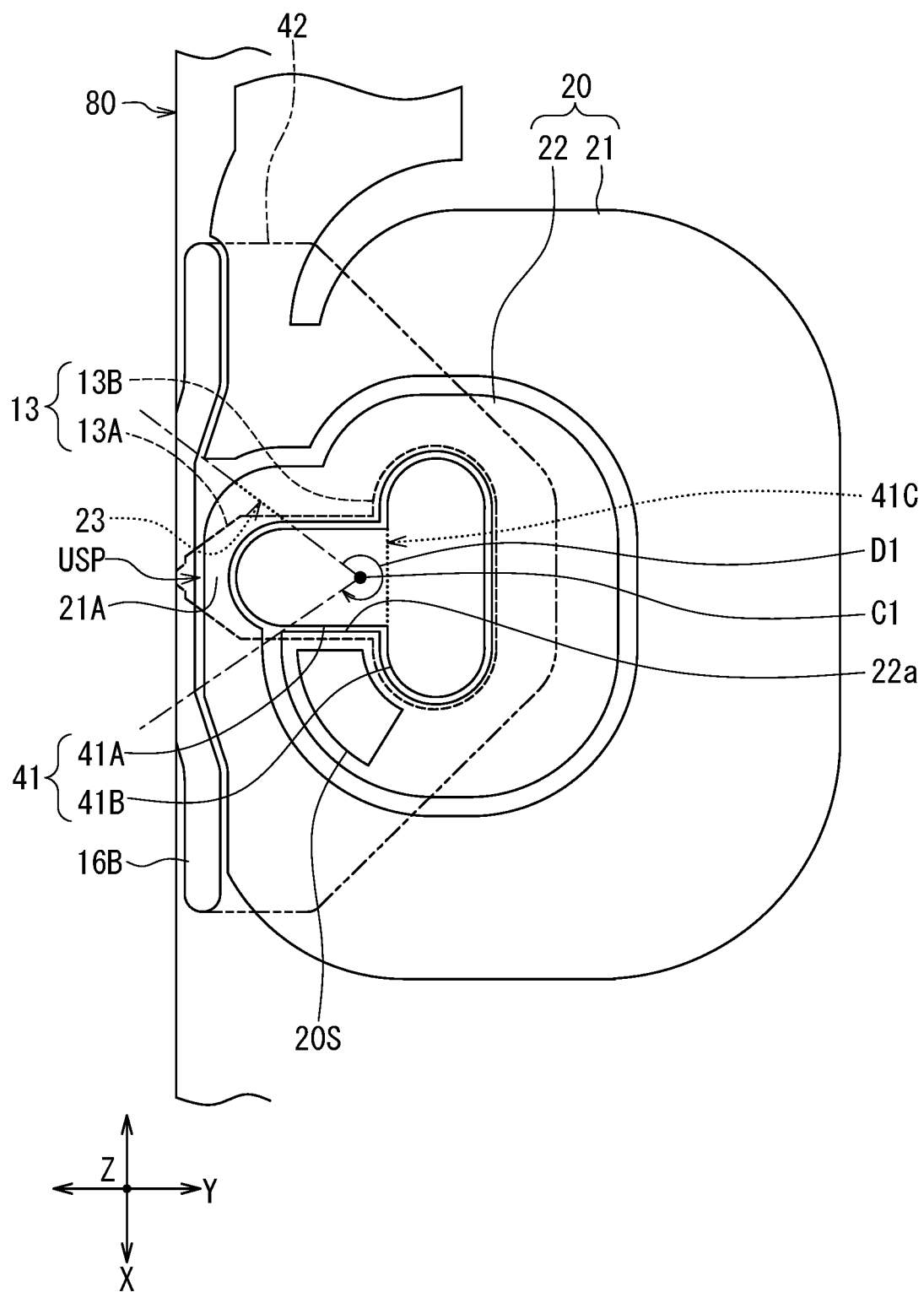
FIG. 9 is a plan view showing an upper coil portion and an upper core section of the magnetic head according to the first embodiment of the invention.

Preferred embodiments of the present invention will now be described in detail with reference to the drawings. First, reference is made to FIG. 6 to FIG. 9 to describe the configuration of a magnetic head according to a first embodiment of the invention. FIG. 6 is a cross-sectional view of the magnetic head according to the present embodiment. FIG. 7 is a front view showing the medium facing surface of the magnetic head according to the present embodiment. FIG. 8 is a plan view showing a lower coil portion and a lower core section of the magnetic head according to the present embodiment. FIG. 9 is a plan view showing an upper coil portion and an upper core section of the magnetic head according to the present embodiment.

The magnetic head according to the present embodiment is a magnetic head for perpendicular magnetic recording. The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Now, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 6, the magnetic head has the medium facing surface 80 mentioned above. As shown in FIG. 6 and FIG. 7, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil, a main pole 13, a write shield 16, and a gap section 17. The coil produces a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel. The main pole 13 has an end face 13a located in the medium facing surface 80, and is configured to pass a magnetic flux corresponding to the magnetic field produced by the coil and to produce a write magnetic field for writing data on the recording medium by means of a perpendicular magnetic recording system. FIG. 6 shows a cross section that intersects the end face 13a of the main pole 13 and that is perpendicular to the medium facing surface 80 and to the top surface 1a of the substrate 1.

As shown in FIG. 7, the write shield 16 includes a bottom shield 16A, a top shield 16B, a first side shield 16C, and a second side shield 16D. The bottom shield 16A is located on the rear side in the direction of travel of the recording medium 90 (the Z direction) relative to the main pole 13. Note that a location on the rear side in the direction of travel of the recording medium 90 relative to the main pole 13 refers to a location that is closer to the top surface 1a of the substrate 1 than the main pole 13. The top shield 16B is located on the front side in the direction of travel of the recording medium 90 relative to the main pole 13. Note that a location on the front side in the direction of travel of the recording medium 90 relative to the main pole 13 refers to a location that is farther from the top surface 1a of the substrate 1 than the main pole 13. The first and second side shields 16C and 16D are located farther from the top surface 1a of the substrate 1 than the bottom shield 16A, being on opposite sides of the main pole 13 in the track width direction (the X direction) and magnetically coupling the bottom shield 16A and the top shield 16B.

As shown in FIG. 6 and FIG. 7, the bottom shield 16A has a front end face 16Aa located in the medium facing surface 80 and a top surface 16Ab farthest from the top surface 1a of the substrate 1. The top shield 16B has a front end face 16Ba located in the medium facing surface 80, a top surface farthest from the top surface 1a of the substrate 1, and a connecting surface connecting the front end face 16Ba and the top surface. The distance from the medium facing surface 80 to any point on the connecting surface increases with increasing distance from the point to the top surface 1a of the substrate 1. As shown in FIG. 7, the first side shield 16C has a first front end face 16Ca located in the medium facing surface 80. The second side shield 16D has a second front end face 16Da located in the medium facing surface 80.

The front end face 16Aa is located on the rear side in the direction of travel of the recording medium 90 relative to the end face 13a of the main pole 13. The front end face 16Ba is located on the front side in the direction of travel of the recording medium 90 relative to the end face 13a of the main pole 13. The first and second front end faces 16Ca and 16Da are located on opposite sides of the end face 13a of the main pole 13 in the track width direction. In the medium facing surface 80, the front end faces 16Aa, 16Ba, 16Ca and 16Da are arranged to surround the end face 13a of the main pole 13.

The write shield 16 is formed of a magnetic material. For example, CoFeN, CoNiFe, FeNi, or CoFe can be used as the material of the write shield 16.

The write head unit 9 further includes a lower return path section 30 and an upper return path section 40. Each of the lower return path section 30 and the upper return path section 40 is formed of a magnetic material. For example, CoFeN, CoNiFe, FeNi, or CoFe can be used as the material of the lower return path section 30 and the upper return path section 40.

The lower return path section 30 is located on the rear side in the direction of travel of the recording medium 90 relative to the main pole 13, and connects part of the main pole 13 located away from the medium facing surface 80 to the write shield 16, thereby magnetically coupling the main pole 13 to the write shield 16. The lower return path section 30 and the main pole 13 define a lower space LSP (see FIG. 8) for a portion of the coil to pass through.

The upper return path section 40 is located on the front side in the direction of travel of the recording medium 90 relative to the main pole 13, and connects part of the main pole 13 located away from the medium facing surface 80 to the write shield 16, thereby magnetically coupling the main pole 13 to the write shield 16. The upper return path section 40 and the main pole 13 define an upper space USP (see FIG. 9) for a portion of the coil to pass through.

The lower return path section 30 includes a lower core section 33 and coupling sections 31, 32 and 34. The coupling section 31 is disposed on the nonmagnetic layer 73. The coupling section 32 and the lower core section 33 are both disposed on the coupling section 31. The coupling section 32 is located near the medium facing surface 80. The lower core section 33 is located farther from the medium facing surface 80 than the coupling section 32. The coupling sections 31 and 32 have their respective end faces facing toward the medium facing surface 80, and those end faces are each located at a distance from the medium facing surface 80.

As shown in FIG. 8, the lower coil portion 10 is wound around the lower core section 33. The write head unit 9 further includes: an insulating layer 51 formed of an insulating material, lying on the nonmagnetic layer 73 and surrounding the coupling section 31; an insulating film 52 formed of an insulating material and isolating the lower coil portion 10 from the coupling sections 31 and 32 and the lower core section 33; and an insulating layer 53 formed of an insulating material and disposed around the lower coil portion 10 and the coupling section 32. The top surfaces of the lower coil portion 10, the coupling section 32, the lower core section 33, the insulating film 52 and the insulating layer 53 are even with each other. The insulating layers 51 and 53 and the insulating film 52 are formed of alumina, for example.

The bottom shield 16A lies on the coupling section 32 and the insulating layer 53. The coupling section 34 lies on the lower core section 33. The write head unit 9 further includes an insulating layer 54 formed of an insulating material, and a nonmagnetic layer 55 formed of a nonmagnetic material. The insulating layer 54 lies on the lower coil portion 10, the insulating film 52 and the insulating layer 53. The nonmagnetic layer 55 lies on the insulating layer 54 and surrounds the bottom shield 16A and the coupling section 34. The insulating layer 54 is formed of alumina, for example. The nonmagnetic layer 55 is formed of alumina or silicon oxide ($SiO_2$), for example.

The first and second side shields 16C and 16D are disposed on the bottom shield 16A and in contact with the top surface 16Ab of the bottom shield 16A. The main pole 13 has a top surface 13T (see FIG. 6) farthest from the top surface 1a of the substrate 1, a bottom end 13L (see FIG. 6) opposite to the top surface 13T, and a plurality of side surfaces (see FIG. 8 and FIG. 9). Each of the first and second side shields 16C and 16D has a plurality of sidewalls. The side surfaces of the main pole 13 and the sidewalls of the first and second side shields 16C and 16D will be described in detail later.

As shown in FIG. 8 and FIG. 9, the main pole 13 may include a track width defining portion 13A and a wide portion 13B, the track width defining portion 13A having an end face located in the medium facing surface 80 and an end opposite to the end face, the wide portion 13B being connected to the end of the track width defining portion 13A. The width of the top surface 13T in the track width direction (the X direction) is greater in the wide portion 13B than in the track width defining portion 13A.

The gap section 17 is provided between the main pole 13 and the write shield 16. The write head unit 9 further includes a first gap layer 18 formed of a nonmagnetic material and a second gap layer 19 formed of a nonmagnetic material, the first gap layer 18 including a portion that constitutes a portion of the gap section 17, the second gap layer 19 including a portion that constitutes another portion of the gap section 17. The aforementioned portion of the first gap layer 18 constituting the portion of the gap section 17 is located between the main pole 13 and each of the bottom shield 16A and the first and second side shields 16C and 16D. The aforementioned portion of the second gap layer 19 constituting the other portion of the gap section 17 is located between the main pole 13 and the top shield 16B.

The first gap layer 18 extends along the sidewalls of the first and second side shields 16C and 16D, the top surface 16Ab of the bottom shield 16A and the top surface of the nonmagnetic layer 55. The nonmagnetic material forming the first gap layer 18 may be an insulating material or a nonmagnetic metal material. Alumina is an example of insulating materials usable for forming the first gap layer 18. Ru is an example of nonmagnetic metal materials usable for forming the first gap layer 18. The first gap layer 18 has a thickness in the range of 30 to 50 nm, for example.

The main pole 13 is disposed over the bottom shield 16A and the nonmagnetic layer 55 such that the first gap layer 18 is interposed between the main pole 13 and each of the top surface 16Ab of the bottom shield 16A and the top surface of the nonmagnetic layer 55. As shown in FIG. 7, the first gap layer 18 is interposed also between the main pole 13 and each of the first and second side shields 16C and 16D.

At a position apart from the medium facing surface 80, the bottom end 13L of the main pole 13 is in contact with the top surface of the coupling section 34. The main pole 13 is formed of a ferromagnetic material containing one or more elements selected from Ni, Fe, and Co, such as FeNi, CoNiFe, or CoFe. The shape of the main pole 13 will be described in detail later.

Figure 4:
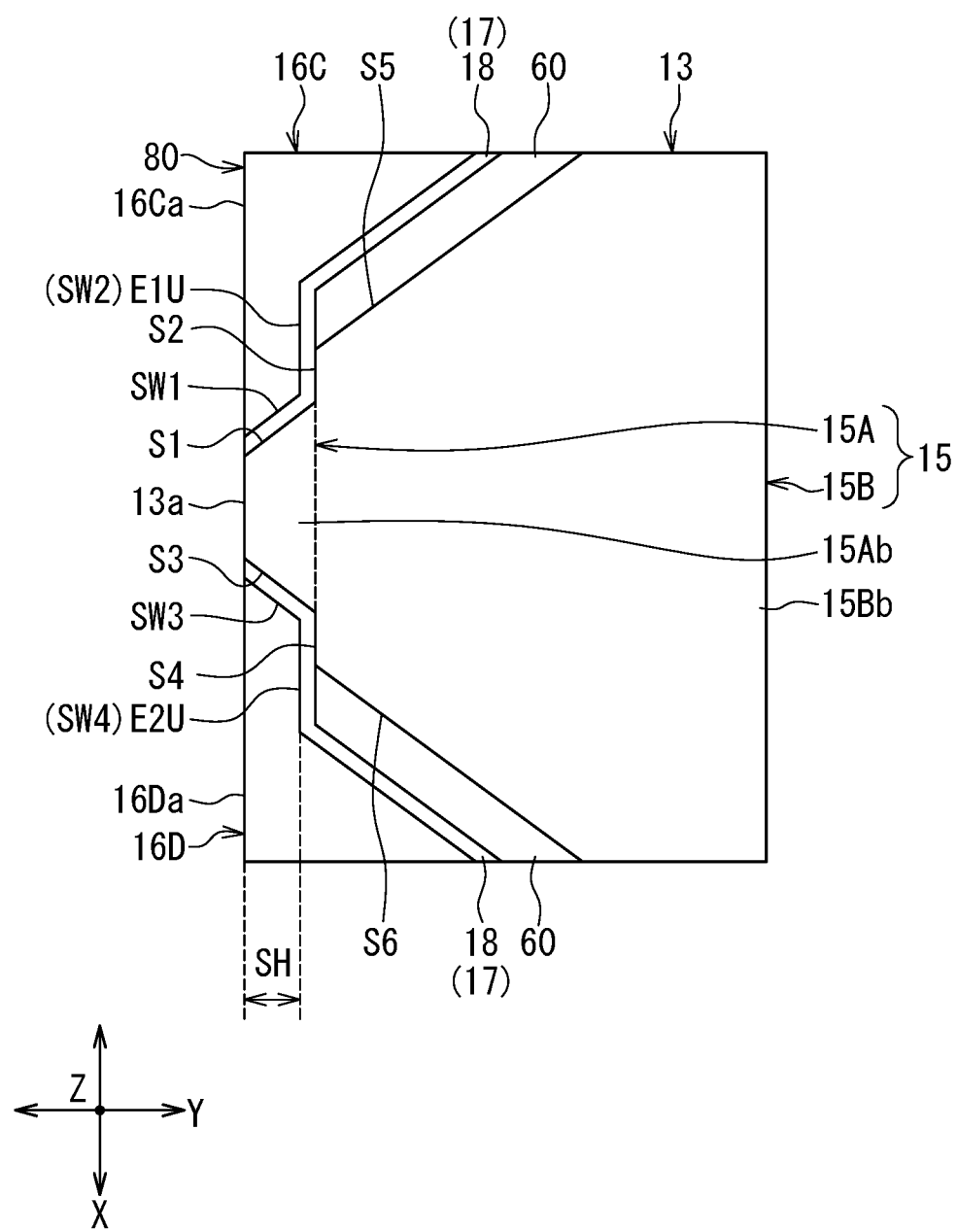
FIG. 4 is a plan view showing the main pole, the first side shield and the second side shield of the magnetic head according to the first embodiment of the invention.

The write head unit 9 further includes a nonmagnetic layer 60 formed of a nonmagnetic material and disposed around the main pole 13, the first side shield 16C and the second side shield 16D. The nonmagnetic layer 60 is shown in FIG. 4 to be described later. The nonmagnetic layer 60 is formed of alumina, for example.

The write head unit 9 further includes a nonmagnetic metal layer 58 formed of a nonmagnetic metal material and disposed on a first portion of the top surface 13T of the main pole 13, the first portion being located away from the medium facing surface 80. The nonmagnetic metal layer 58 is formed of Ru, NiCr, or NiCu, for example.

The second gap layer 19 is disposed to cover the main pole 13 and the nonmagnetic metal layer 58. For example, the nonmagnetic material forming the second gap layer 19 may be silicon oxide.

The write head unit 9 further includes a nonmagnetic layer 61 formed of a nonmagnetic material and disposed on the second gap layer 19. The nonmagnetic layer 61 has an end closest to the medium facing surface 80, the end being located at a distance from the medium facing surface 80. The nonmagnetic layer 61 is formed of alumina, for example.

The top shield 16B lies over the side shields 16C and 16D, the second gap layer 19 and the nonmagnetic layer 61, and is in contact with the top surfaces of the side shields 16C and 16D, the second gap layer 19 and the nonmagnetic layer 61. In the medium facing surface 80, a portion of the front end face 16Ba of the top shield 16B is spaced from the end face 13a of the main pole 13 by a predetermined distance created by the thickness of the second gap layer 19. The thickness of the second gap layer 19 preferably falls within the range of 5 to 60 nm, and may be 30 to 60 nm, for example. The end face 13a of the main pole 13 has a side adjacent to the second gap layer 19, the side defining the track width.

The upper return path section 40 includes an upper core section 41 and a coupling section 42. The upper core section 41 lies on a second portion of the top surface 13T of the main pole 13, the second portion being located away from the medium facing surface 80. The second portion of the top surface 13T of the main pole 13 is located farther from the medium facing surface 80 than the first portion of the top surface 13T of the main pole 13.

As shown in FIG. 9, the upper coil portion 20 is wound around the upper core section 41. The write head unit 9 further includes: an insulating film 62 formed of an insulating material and separating at least part of the upper coil portion 20 from the top shield 16B, the upper core section 41 and the nonmagnetic layer 61; an insulating layer 63 formed of an insulating material and disposed around the top shield 16B and the upper coil portion 20; and an insulating layer 64 formed of an insulating material and disposed on the upper coil portion 20 and the insulating film 62. The insulating film 62 and the insulating layers 63 and 64 are formed of alumina, for example.

The coupling section 42 lies over the top shield 16B, the upper core section 41 and the insulating layer 64. The coupling section 42 has an end face facing toward the medium facing surface 80, the end face being located at a distance from the medium facing surface 80.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction of travel of the recording medium 90 (the Z direction) relative to the read head unit 8.

The write head unit 9 includes the coil including the upper coil portion 20 and the lower coil portion 10, the main pole 13, the write shield 16, and the gap section 17. The coil, the main pole 13, the write shield 16 and the gap section 17 are disposed above the top surface 1a of the substrate 1. The write shield 16 includes the bottom shield 16A, the top shield 16B, the first side shield 16C, and the second side shield 16D. The gap section 17 is composed of part of the first gap layer 18 and part of the second gap layer 19. Since the first and second gap layers 18 and 19 are both formed of nonmagnetic material, the gap section 17 is formed of nonmagnetic material.

The write head unit 9 further includes the upper return path section 40 and the lower return path section 30. The lower return path section 30 includes the lower core section 33 and the coupling sections 31, 32 and 34. The upper return path section 40 includes the upper core section 41 and the coupling section 42.

The write shield 16 captures a disturbance magnetic field applied to the magnetic head from outside the magnetic head. This can prevent erroneous writing on the recording medium 90 that would be caused by the disturbance magnetic field being intensively captured into the main pole 13. The write shield 16 further has the function of capturing a magnetic flux that is produced from the end face 13a of the main pole 13 and spreads in directions other than the direction perpendicular to the plane of the recording medium 90, and thereby preventing the magnetic flux from reaching the recording medium 90. Furthermore, the write shield 16, the lower return path section 30 and the upper return path section 40 have the function of allowing a magnetic flux that has been produced from the end face 13a of the main pole 13 and has magnetized a portion of the recording medium 90 to flow back.

Reference is now made to FIG. 8 and FIG. 9 to describe the upper coil portion 20 and the lower coil portion 10 of the coil, the upper core section 41, and the lower core section 33 in detail. The lower coil portion 10 has a coil connection 10E electrically connected to the upper coil portion 20. The upper coil portion 20 has a coil connection 20S electrically connected to the coil connection 10E of the lower coil portion 10. The coil connection 20S is electrically connected to the coil connection 10E via a first and a second connection layer of columnar shape (not illustrated) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example shown in FIG. 8 and FIG. 9, the upper coil portion 20 and the lower coil portion 10 are connected in series.

Now, a first direction, a second direction, and a third direction will be defined as follows. The first direction is a direction parallel to the Z direction. The second direction is the track width direction, i.e., the X direction. The third direction is a direction perpendicular to the medium facing surface 80, i.e., the Y direction. The first direction is perpendicular to the second and third directions. FIG. 8 shows the lower coil portion 10 and the lower core section 33 as viewed in the first direction. FIG. 9 shows the upper coil portion 20 and the upper core section 41 as viewed in the first direction.

As shown in FIG. 9, when viewed in the first direction, the upper coil portion 20 is wound around the entire perimeter of the upper core section 41. The upper coil portion 20 includes a first winding portion 21 and a second winding portion 22 connected in series. In FIG. 9, the boundary 23 between the first winding portion 21 and the second winding portion 22 is shown by a dotted line. The first winding portion 21 includes a first coil element 21A extending to pass through the upper space USP, and extends once around the entire perimeter of the upper core section 41 when viewed in the first direction. Note that a coil element refers to part of the winding of the coil.

In FIG. 9, the point denoted by the symbol C1 indicates a center point C1 of the upper core section 41. The center point C1 of the upper core section 41 is a point located at a center of the upper core section 41 in the second direction (the X direction) and also in the third direction (the Y direction) when viewed in the first direction. In the present embodiment, the second winding portion 22 includes no portion passing through the upper space USP. More specifically, the second winding portion 22 does not pass through the upper space USP and, when viewed in the first direction, the second winding portion 22 extends less than once around the entire perimeter of the upper core section 41 and rotates n degrees about the center point C1 of the upper core section 41. In FIG. 9, the arrow denoted by the symbol D1 indicates the direction of rotation of the second winding portion 22. The foregoing n is greater than 270 and smaller than 360, and is preferably not smaller than 288 and not greater than 324. In the example shown in FIG. 9, n is 288.

As shown in FIG. 9, the upper core section 41 includes a first portion 41A and a second portion 41B coupled to each other. In FIG. 9 the boundary 41C between the first portion 41A and the second portion 41B is indicated by a dotted line. When viewed in the first direction, the first portion 41A is located closer to the medium facing surface 80 than the second portion 41B. Further, when viewed in the first direction, the first portion 41A is smaller than the second portion 41B in maximum dimension in the second direction (the X direction).

In the example shown in FIG. 9, the first portion 41A is shaped to be long in the third direction (the Y direction) when viewed in the first direction. The first portion 41A includes a constant-width portion whose dimension in the second direction (the X direction) is substantially constant regardless of distance from the medium facing surface 80. The second portion 41B is shaped to be long in the second direction (the X direction) when viewed in the first direction.

The second winding portion 22 has an end 22a that is located on the opposite side from the boundary with the first winding portion 21 when viewed in the first direction. When viewed in the first direction, the end 22a of the second winding portion 22 is located on one side of the first portion 41A in the second direction (the X direction). In the example shown in FIG. 9, the end 22a of the second winding portion 22 is located at a predetermined distance from the constant-width portion of the first portion 41A.

By virtue of the foregoing features of the first portion 41A and the second winding portion 22, the present embodiment provides a greater angle of rotation of the second winding portion 22 than in the case where the maximum dimension of the first portion 42A in the second direction is greater than or equal to the maximum dimension of the second portion 42B in the second direction. According to the present embodiment, it is possible to reduce the length of the magnetic path passing through the upper return path section 40 and the main pole 13 and to sufficiently increase the magnetomotive force of the upper coil portion 20.

As shown in FIG. 8, the lower coil portion 10 of the coil is wound around the entire perimeter of the lower core section 33 when viewed in the first direction. The lower coil portion 10 includes a third winding portion 11. The third winding portion 11 includes one third coil element 11A extending to pass through the lower space LSP, and extends once around the entire perimeter of the lower core section 33 when viewed in the first direction.

In FIG. 8, the point denoted by the symbol C2 indicates a center point C2 of the lower core section 33. The center point C2 of the lower core section 33 is a point located at a center of the lower core section 33 in the second direction (the X direction) and also in the third direction (the Y direction) when viewed in the first direction. When viewed in the first direction, the lower coil portion 10 rotates 360 degrees or more about the center point C2 of the lower core section 33.

As shown in FIG. 8, the lower core section 33 includes a third portion 33A and a fourth portion 33B coupled to each other. In FIG. 8 the boundary 33C between the third portion 33A and the fourth portion 33B is indicated by a dotted line. When viewed in the first direction, the third portion 33A is located closer to the medium facing surface 80 than the fourth portion 33B. In the example shown in FIG. 8, the third and fourth portions 33A and 33B are the same in shape as the first and second portions 41A and 41B shown in FIG. 9, respectively.

Figure 1:
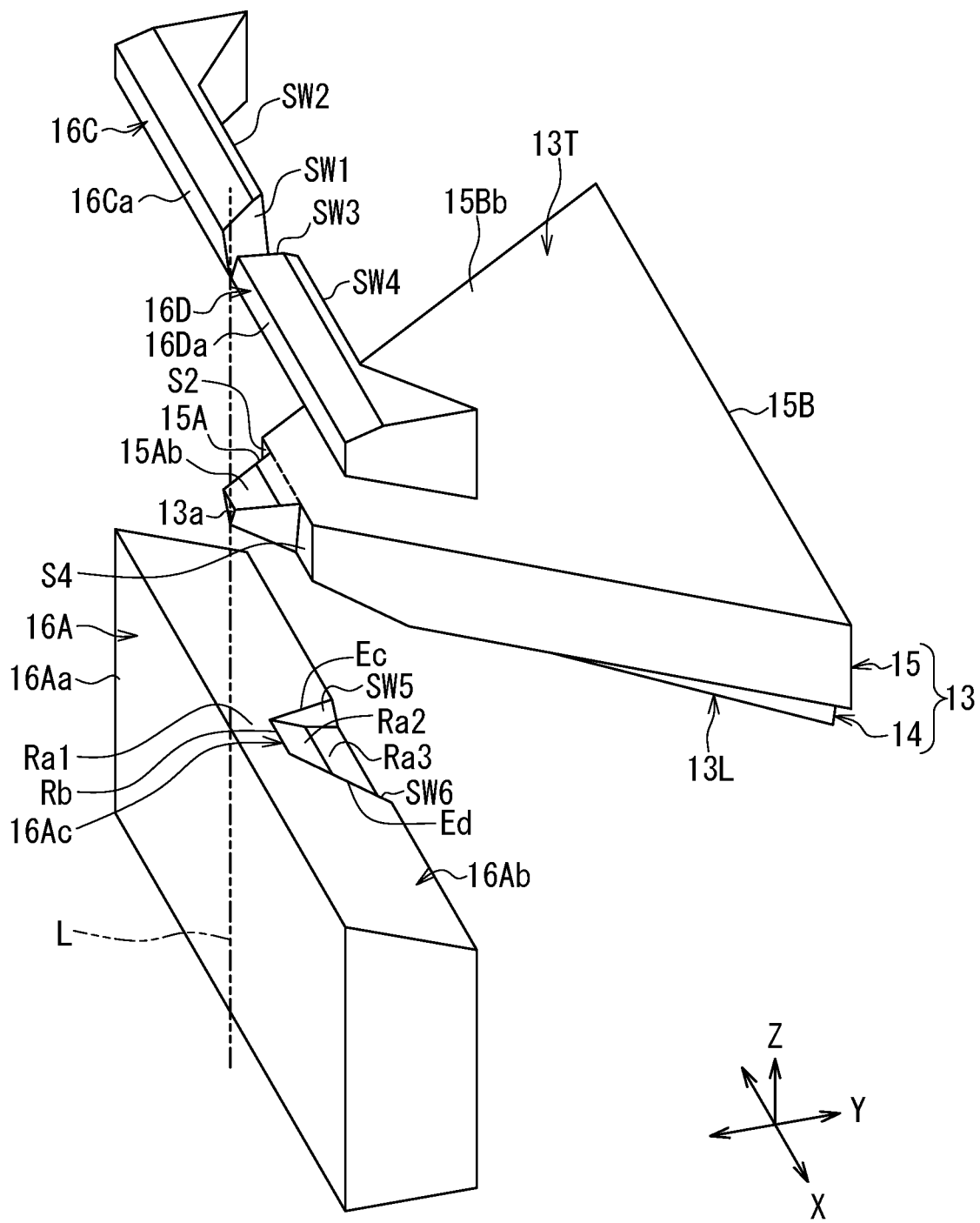
FIG. 1 is a perspective view showing a main pole, a bottom shield, a first side shield and a second side shield of a magnetic head according to a first embodiment of the invention.
Figure 2:
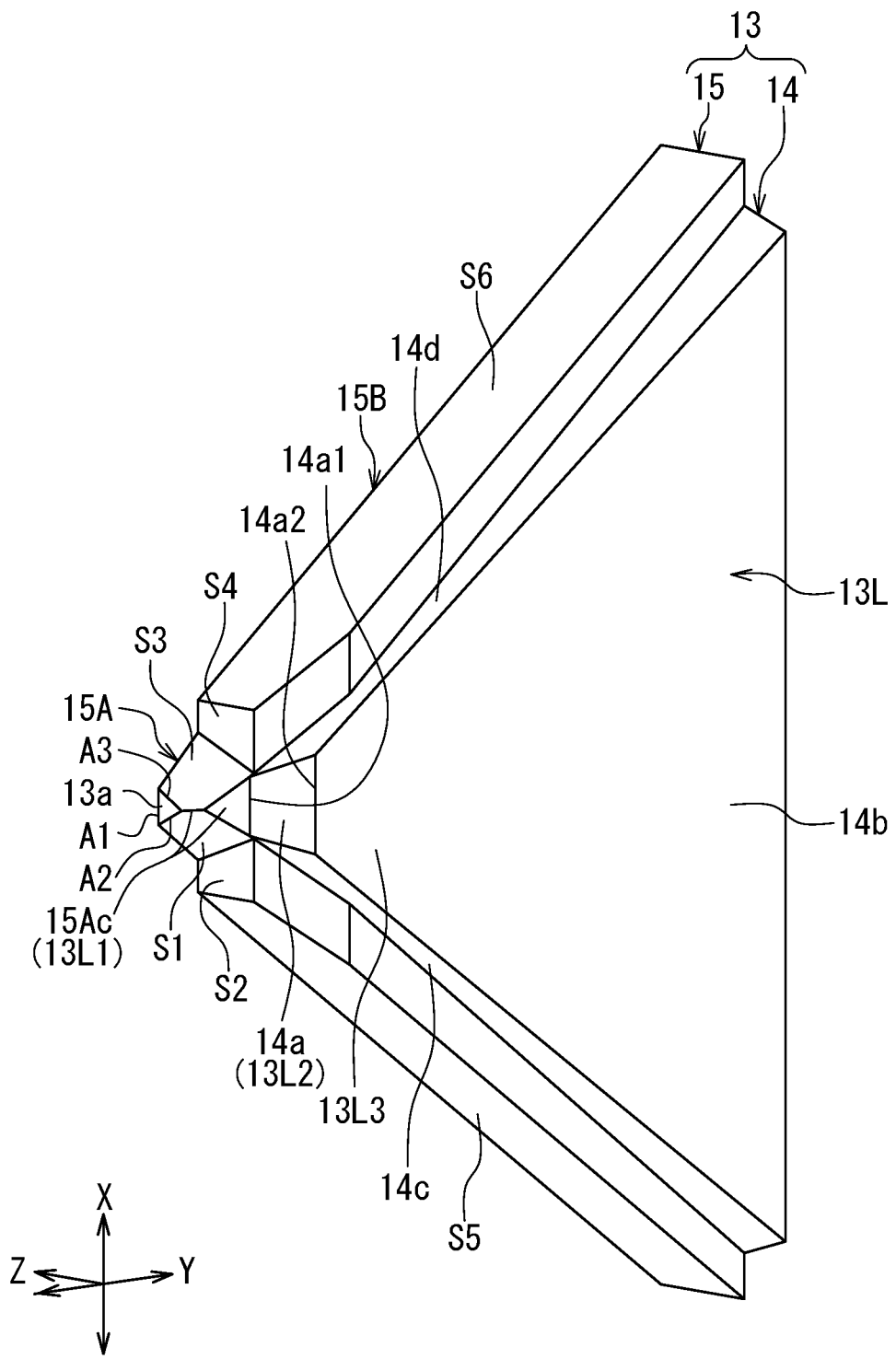
FIG. 2 is a perspective view of the main pole of the magnetic head according to the first embodiment of the invention.
Figure 3:
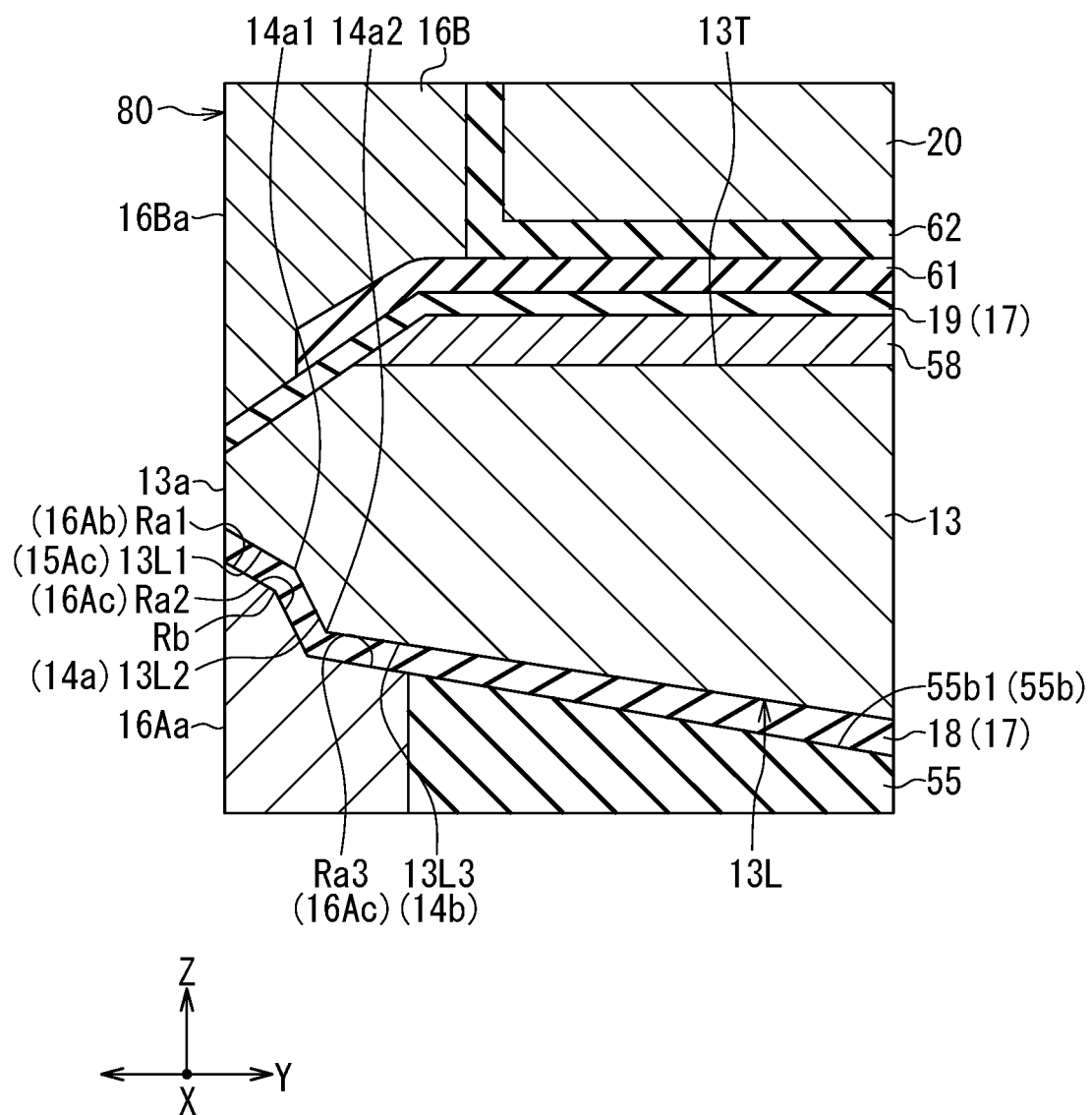
FIG. 3 is a cross-sectional view showing essential parts of the magnetic head according to the first embodiment of the invention.

The main pole 13, the bottom shield 16A, the first side shield 16C, the second side shield 16D and the nonmagnetic layer 55 will now be described in detail. First, the shape of the main pole 13 will be described with reference to FIG. 1 to FIG. 4. FIG. 1 is an exploded perspective view of the main pole 13, the bottom shield 16A, the first side shield 16C and the second side shield 16D. In FIG. 1, the straight chain double-dashed line denoted by the symbol L represents an imaginary straight line perpendicular to the top surface 1a of the substrate 1 and passing through the end face 13a of the main pole 13. FIG. 1 depicts the main pole 13, the bottom shield 16A and the side shields 16C and 16D as separate from each other along the imaginary straight line L. FIG. 2 is a perspective view of the main pole 13. FIG. 3 is a cross-sectional view showing essential parts of the magnetic head. FIG. 4 is a plan view showing the main pole 13 and the side shields 16C and 16D.

As shown in FIG. 1 to FIG. 4, the main pole 13 has the end face 13a located in the medium facing surface 80, the top surface 13T farthest from the top surface 1a of the substrate 1, the bottom end 13L opposite to the top surface 13T, and first to sixth side surfaces S1, S2, S3, S4, S5 and S6. As shown in FIG. 2, the end face 13a of the main pole 13 has a first side A1 lying at an end of the top surface 13T, and has a second side A2 and a third side A3 opposite to each other in the track width direction (the X direction). The first side A1 is in contact with the second gap layer 19. The distance between the second side A2 and the third side A3 in the track width direction decreases with increasing proximity to the top surface 1a of the substrate 1. Each of the second side A2 and the third side A3 forms an angle in the range of, for example, 7° to 17°, preferably in the range of 10° to 15°, with respect to a direction perpendicular to the top surface 1a of the substrate 1. The first side A1 has a length in the range of 0.05 to 0.20 μm, for example.

As shown in FIG. 2, the first side surface S1 is connected to the second side A2. The second side surface S2 is located farther from the medium facing surface 80 than the first side surface S1. The fifth side surface S5 is connected to the second side surface S2, and is located farther from the medium facing surface 80 than the second side surface S2.

Further, as shown in FIG. 2, the third side surface S3 is connected to the third side A3. The fourth side surface S4 is located farther from the medium facing surface 80 than the third side surface S3. The sixth side surface S6 is connected to the fourth side surface S4, and is located farther from the medium facing surface 80 than the fourth side surface S4.

As shown in FIG. 1 and FIG. 2, the main pole 13 includes a main body 15, and a lower protrusion 14 protruding from the main body 15 toward the top surface 1a (see FIG. 6 and FIG. 7) of the substrate 1. The lower protrusion 14 is located at a distance from the medium facing surface 80. As shown in FIG. 1, FIG. 2 and FIG. 4, the main body 15 includes a front portion 15A located closer to the medium facing surface 80 than the lower protrusion 14, and a rear portion 15B located farther from the medium facing surface 80 than the front portion 15A. In FIG. 1 and FIG. 4 the boundary between the front portion 15A and the rear portion 15B is indicated in a broken line.

As shown in FIG. 1, FIG. 2 and FIG. 4, the front portion 15A includes the end face 13a and the first and third side surfaces S1 and S3 of the main pole 13. The rear portion 15B includes the second, fourth, fifth and sixth side surfaces S2, S4, S5 and S6. The front portion 15A further includes a first portion 15Ab which is a portion of the top surface 13T of the main pole 13. The rear portion 15B includes a second portion 15Bb which is the remainder of the top surface 13T of the main pole 13. The first portion 15Ab includes an inclined portion and a flat portion, the inclined portion being located closer to the medium facing surface 80 than the flat portion. The inclined portion has a first end located in the medium facing surface 80 and a second end opposite thereto. The flat portion is connected to the second end of the inclined portion. The inclined portion is inclined such that the second end is located on the front side in the direction of travel of the recording medium 90 (the Z direction) relative to the first end. The flat portion extends in a direction substantially perpendicular to the medium facing surface 80. The width of the first portion 15Ab in the track width direction may gradually increase with increasing distance from the medium facing surface 80 as shown in FIG. 1 and FIG. 4, or may be substantially constant regardless of distance from the medium facing surface 80.

The second portion 15Bb is contiguous with the flat portion of the first portion 15Ab. The second portion 15Bb extends in a direction substantially perpendicular to the medium facing surface 80. As shown in FIG. 1 and FIG. 4, the width of the second portion 15Bb in the track width direction is greater than that of the first portion 15Ab at the boundary with the front portion 15A, and increases with increasing distance from the medium facing surface 80.

As shown in FIG. 2, the front portion 15A has a bottom end 15Ac opposite to the first portion 15Ab. The bottom end 15Ac has a first end located in the medium facing surface 80 and a second end opposite thereto. The bottom end 15Ac is inclined such that its second end is located on the rear side in the direction of travel of the recording medium 90 relative to its first end. In the example shown in FIG. 2, the bottom end 15Ac of the front portion 15A includes an edge portion and a plane portion, the edge portion being located closer to the medium facing surface 80 than the plane portion. The edge portion is an edge formed by two intersecting planes. The plane portion is a plane connecting two planes to each other. The bottom end 15Ac may be entirely constituted by the plane portion.

As shown in FIG. 2, the lower protrusion 14 has a front end face 14a facing toward the medium facing surface 80, a bottom surface 14b facing toward the top surface 1a (see FIG. 6 and FIG. 7) of the substrate 1, and a first side portion 14c and a second side portion 14d opposite to each other in the track width direction. In any cross section intersecting the rear portion 15B and parallel to the medium facing surface 80, the rear portion 15B has a greater width in the track width direction than that of the lower protrusion 14.

The coupling section 34 (see FIG. 6) of the lower return path section 30 is in contact with the lower protrusion 14. In the present embodiment, the entirety of the bottom surface 14b of the lower protrusion 14 is inclined with respect to a direction perpendicular to the medium facing surface 80 such that the lower protrusion 14 gradually increases in thickness with increasing proximity to the coupling section 34. The maximum thickness of the lower protrusion 14 is smaller than that of the main body 15.

As shown in FIG. 2, the front end face 14a of the lower protrusion 14 has a third end 14a1 closest to the medium facing surface 80, and a fourth end 14a2 farthest from the medium facing surface 80. The front end face 14a is inclined such that the fourth end 14a2 is located on the rear side in the direction of travel of the recording medium 90 relative to the third end 14a1. The third end 14a1 coincides with the second end of the bottom end 15Ac of the front portion 14A. As shown in FIG. 2, the width of the front end face 14a in the track width direction is equal to that of the bottom end 15Ac of the front portion 15A at the boundary with the front portion 15A, and increases with increasing distance from the medium facing surface 80.

The bottom surface 14b of the lower protrusion 14 is connected to the fourth end 14a2. The width of the bottom surface 14b in the track width direction is equal to that of the front end face 14a at the boundary with the front end face 14a, and increases with increasing distance from the medium facing surface 80.

In any cross section intersecting the first and second side portions 14c and 14d and parallel to the medium facing surface 80, the distance between the first side portion 14c and the second side portion 14d in the track width direction decreases with increasing proximity to the top surface 1a of the substrate 1. Alternatively, in the aforementioned cross section, the distance between the first side portion 14c and the second side portion 14d in the track width direction may be constant regardless of distance from the top surface 1a of the substrate 1.

Figure 5:
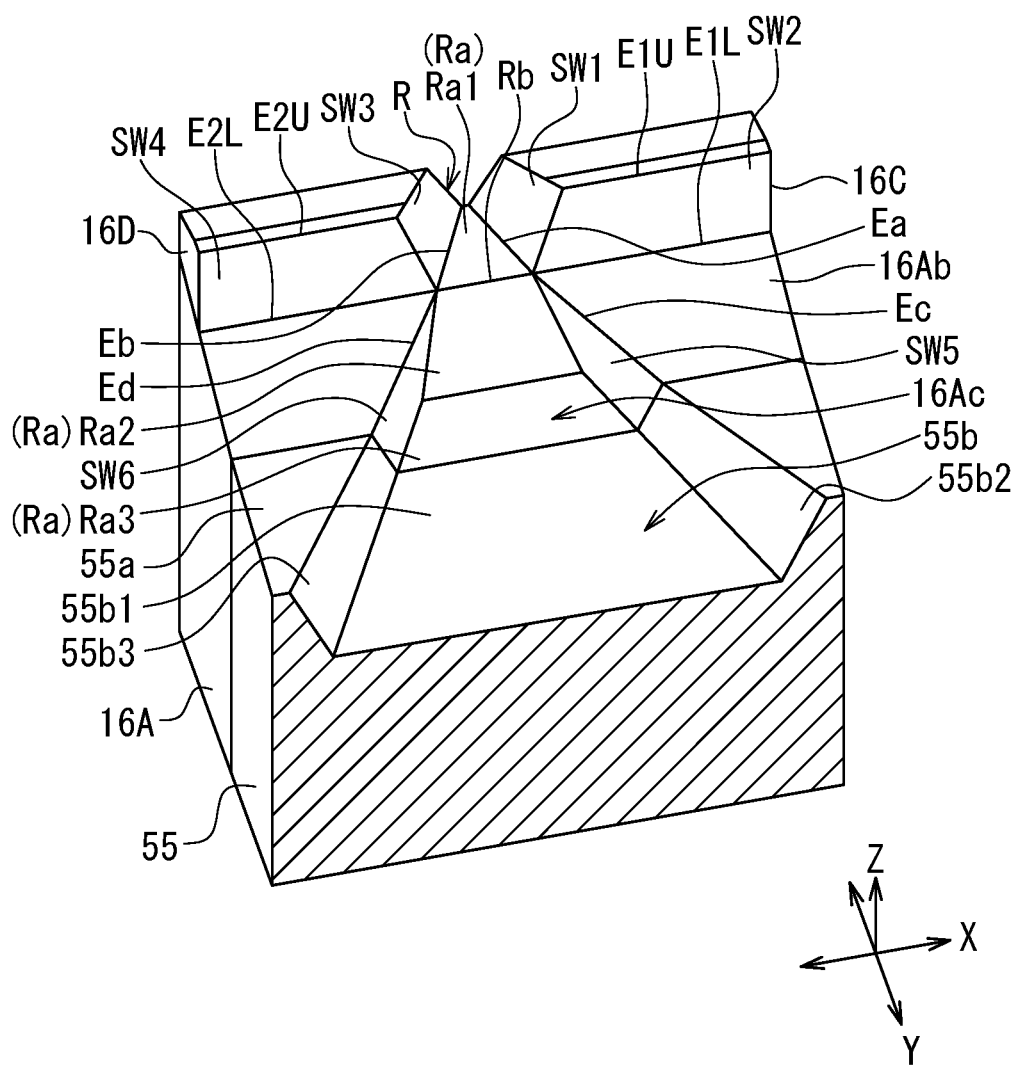
FIG. 5 is a perspective view showing the bottom shield, the first side shield, the second side shield and a nonmagnetic layer of the magnetic head according to the first embodiment of the invention.

The shapes and arrangement of the bottom shield 16A, the first side shield 16C, the second side shield 16D and the nonmagnetic layer 55 will now be described with reference to FIG. 1 to FIG. 5. FIG. 5 is a perspective view showing the bottom shield 16A, the first side shield 16C, the second side shield 16D and the nonmagnetic layer 55. In FIG. 5, the hatched portion represents a cross section of the nonmagnetic layer 55 parallel to the medium facing surface 80. As shown in FIG. 1 and FIG. 3, the bottom shield 16A is located on the rear side in the direction of travel of the recording medium 90 (the Z direction) relative to the front portion 15A. The top shield 16B is located on the front side in the direction of travel of the recording medium 90 relative to the front portion 15A. As shown in FIG. 1 and FIG. 4, the first and second side shields 16C and 16D are located on opposite sides of the front portion 15A in the track width direction (the X direction).

As shown in FIG. 1, FIG. 4 and FIG. 5, the first side shield 16C has a first front end face 16Ca located in the medium facing surface 80, and a first sidewall SW1 and a second sidewall SW2 facing the main pole 13. The second side shield 16D has a second front end face 16Da located in the medium facing surface 80, and a third sidewall SW3 and a fourth sidewall SW4 facing the main pole 13. The first sidewall SW1 is connected to the first front end face 16Ca. The second sidewall SW2 is connected to the first sidewall SW1, and located farther from the medium facing surface 80 than the first sidewall SW1. The third sidewall SW3 is connected to the second front end face 16Da. The fourth sidewall SW4 is connected to the third sidewall SW3, and located farther from the medium facing surface 80 than the third sidewall SW3.

As shown in FIG. 5, the first sidewall SW1 of the first side shield 16C has a first edge Ea closest to the top surface 1a (see FIG. 6 and FIG. 7) of the substrate 1. The third sidewall SW3 of the second side shield 16D has a second edge Eb closest to the top surface 1a of the substrate 1. The distance between the first edge Ea and the second edge Eb in the track width direction increases with increasing distance from the medium facing surface 80.

As shown in FIG. 1 and FIG. 5, each of the first and third sidewalls SW1 and SW3 is inclined with respect to a direction perpendicular to the top surface 1a of the substrate 1. In any cross section intersecting the first and third sidewalls SW1 and SW3 and parallel to the medium facing surface 80, the distance between the first sidewall SW1 and the third sidewall SW3 in the track width direction decreases with increasing proximity to the top surface 1a of the substrate 1. Each of the first sidewall SW1 and the third sidewall SW3 forms an angle in the range of, for example, 7° to 17°, preferably in the range of 10° to 15°, with respect to a direction perpendicular to the top surface 1a of the substrate 1.

As shown in FIG. 4 and FIG. 5, the second sidewall SW2 has a top edge E1U farthest from the top surface 1a of the substrate 1, and a bottom edge E1L closest to the top surface 1a of the substrate 1. The fourth sidewall SW4 has a top edge E2U farthest from the top surface 1a of the substrate 1, and a bottom edge E2L closest to the top surface 1a of the substrate 1. The top edges E1U and E2U are substantially parallel to the medium facing surface 80. Here, the distance from each of the top edges E1U and E2U to the medium facing surface 80 is defined as the side shield height SH, and an edge of the top surface of each of the side shields 16C and 16D that faces the main pole 13 will be referred to as the pole-facing edge. The side shield height SH is equal to the distance from the medium facing surface 80 to a point on the pole-facing edge at which the distance between the main pole 13 and the pole-facing edge starts to increase.

In the present embodiment, the bottom edges E1L and E2L are substantially parallel to the medium facing surface 80. The distance from each of the top edges E1U and E2U to the medium facing surface 80, i.e., the side shield height SH, is approximately equal to the distance from each of the bottom edges E1L and E2L to the medium facing surface 80. The specific value of the distance from each of the bottom edges E1L and E2L to the medium facing surface 80 and that of the side shield height SH will be described later.

The distance from the medium facing surface 80 to any point on the second sidewall SW2 may be constant regardless of the distance from the point to the top surface 1a of the substrate 1, or may increase or decrease with decreasing distance from the point to the top surface 1a of the substrate 1. Similarly, the distance from the medium facing surface 80 to any point on the fourth sidewall SW4 may be constant regardless of the distance from the point to the top surface 1a of the substrate 1, or may increase or decrease with decreasing distance from the point to the top surface 1a of the substrate 1. In all of the above cases, the second sidewall SW2 forms a smaller angle with respect to a direction perpendicular to the top surface 1a of the substrate 1 than does the first sidewall SW1, and the fourth sidewall SW4 forms a smaller angle with respect to the direction perpendicular to the top surface 1a of the substrate 1 than does the third sidewall SW3. In other words, the second sidewall SW2 and the fourth sidewall SW4 are closer to perpendicular to the top surface 1a of the substrate 1, compared with the first sidewall SW1 and the third sidewall SW3.

For the case where the distance from the medium facing surface 80 to any point on each of the sidewalls SW2 and SW4 increases with decreasing distance from the point to the top surface 1a of the substrate 1, the angle formed by each of the sidewalls SW2 and SW4 with respect to a direction perpendicular to the top surface 1a of the substrate 1 will be expressed in positive values. For the case where the distance from the medium facing surface 80 to any point on each of the sidewalls SW2 and SW4 decreases with decreasing distance from the point to the top surface 1a of the substrate 1, the angle formed by each of the sidewalls SW2 and SW4 with respect to a direction perpendicular to the top surface 1a of the substrate 1 will be expressed in negative values. The angle formed by each of the sidewalls SW2 and SW4 with respect to a direction perpendicular to the top surface 1a of the substrate 1 preferably falls within the range of −7° to 7°, more preferably within the range of −7° to 0°. When the foregoing angle is 0°, the sidewalls SW2 and SW4 are perpendicular to the top surface 1a of the substrate 1 and parallel to the medium facing surface 80.

The distance between the top end of the sidewall SW1 and the top end of the sidewall SW3 in the track width direction may increase with increasing distance from the medium facing surface 80 as shown in FIG. 1 and FIG. 4, or may be constant regardless of distance from the medium facing surface 80.

As shown in FIG. 1 and FIG. 5, the top surface 16Ab of the bottom shield 16A is inclined with respect to a direction perpendicular to the medium facing surface 80 in the following manner. The distance from the top surface 1a of the substrate 1 to any point on the top surface 16Ab decreases with increasing distance from the point to the medium facing surface 80.

As shown in FIG. 1 and FIG. 5, the top surface 16Ab of the bottom shield 16A has a recessed portion 16Ac which is recessed to get closer to the top surface 1a of the substrate 1. The recessed portion 16Ac has a bottom surface, and has a fifth sidewall SW5 and a sixth sidewall SW6 on opposite sides of the bottom surface in the track width direction. The bottom surface of the recessed portion 16Ac includes a first bottom-surface portion and a second bottom-surface portion, the first bottom-surface portion being closer to the medium facing surface 80 than the second bottom-surface portion.

As shown in FIG. 1 and FIG. 5, the fifth sidewall SW5 of the recessed portion 16Ac has a third edge Ec farthest from the top surface 1a of the substrate 1. The sixth sidewall SW6 of the recessed portion 16Ac has a fourth edge Ed farthest from the top surface 1a of the substrate 1. The distance between the third edge Ec and the fourth edge Ed in the track width direction increases with increasing distance from the medium facing surface 80.

In any cross section intersecting the fifth and sixth sidewalls SW5 and SW6 and parallel to the medium facing surface 80, the distance between the fifth sidewall SW5 and the sixth sidewall SW6 in the track width direction decreases with increasing proximity to the top surface 1a of the substrate 1. Alternatively, in the aforementioned cross section, the distance between the fifth sidewall SW5 and the sixth sidewall SW6 in the track width direction may be constant regardless of distance from the top surface 1a of the substrate 1.

As shown in FIG. 3 and FIG. 5, the nonmagnetic layer 55 is located farther from the medium facing surface 80 than the bottom shield 16A and contiguous with the bottom shield 16A. The nonmagnetic layer 55 has a top surface 55a farthest from the top surface 1a of the substrate 1. The top surface 55a of the nonmagnetic layer 55 has a recessed portion 55*b* which is recessed to get closer the top surface 1*a* of the substrate 1. The recessed portion 55*b* has a bottom surface 55*b*1 contiguous with the bottom surface of the recessed portion 16Ac, a wall face 55*b*2 contiguous with the fifth sidewall SW5 of the recessed portion 16Ac, and a wall face 55*b*3 contiguous with the sixth sidewall SW6 of the recessed portion 16Ac.

The bottom surface 55*b*1 of the recessed portion 55*b* is inclined with respect to a direction perpendicular to the medium facing surface 80 in the following manner. The distance from the top surface 1*a* of the substrate 1 to any point on the bottom surface 55*b*1 decreases with increasing distance from the point to the medium facing surface 80.

In any cross section intersecting the wall faces 55*b*2 and 55*b*3 and parallel to the medium facing surface 80, the distance between the wall faces 55*b*2 and 55*b*3 in the track width direction decreases with increasing proximity to the top surface 1*a* of the substrate 1. Alternatively, in the aforementioned cross section, the distance between the wall faces 55*b*2 and 55*b*3 in the track width direction may be constant regardless of distance from the top surface 1*a* of the substrate 1.

The positional relationships between the main pole 13, the bottom shield 16A, the side shields 16C and 16D, and the nonmagnetic layer 55 will now be described with reference to FIG. 1 to FIG. 5. As shown in FIG. 5, the bottom shield 16A and the first and second side shields 16C and 16D are configured so that a portion of the top surface 16Ab of the bottom shield 16A, the first sidewall SW1, and the third sidewall SW3 define a receiving section R to receive a portion of the main pole 13. In the present embodiment, part of the top surface 16Ab of the bottom shield 16A lying between the first sidewall SW1 and the third sidewall SW3, and the recessed portion 16Ac correspond to the aforementioned portion of the top surface 16Ab of the bottom shield 16A.

As shown in FIG. 4, the first side surface S1 of the main pole 13 is opposed to the first sidewall SW1. The third side surface S3 of the main pole 13 is opposed to the third sidewall SW3. The preferred range of the angle formed by each of the side surfaces S1 and S3 with respect to a direction perpendicular to the top surface 1*a* of the substrate 1 is the same as that of the angle formed by each of the sidewalls SW1 and SW3.

As shown in FIG. 4, part of the second side surface S2 of the main pole 13 is opposed to the second sidewall SW2. Part of the fourth side surface S4 of the main pole 13 is opposed to the fourth sidewall SW4. The second side surface S2 forms a smaller angle with respect to a direction perpendicular to the top surface 1*a* of the substrate 1 than does the first side surface S1, and the fourth side surface S4 forms a smaller angle with respect to the direction perpendicular to the top surface 1*a* of the substrate 1 than does the third side surface S3. In other words, the second side surface S2 and the fourth side surface S4 are closer to perpendicular to the top surface 1*a* of the substrate 1, compared with the first side surface S1 and the third side surface S3. The preferred range of the angle formed by each of the side surfaces S2 and S4 with respect to a direction perpendicular to the top surface 1*a* of the substrate 1 is the same as that of the angle formed by each of the sidewalls SW2 and SW4.

As shown in FIG. 5, the receiving section R has a bottom Ra which is constituted by a portion of the top surface 16Ab of the bottom shield 16A and opposed to a portion of the bottom end 13L of the main pole 13. As shown in FIG. 3 and FIG. 5, the bottom Ra includes a first inclined portion Ra1, a second inclined portion Ra2, and a third inclined portion Ra3 arranged in this order, the first inclined portion Ra1 being closest to the medium facing surface 80. In the present embodiment, the first inclined portion Ra1 is constituted by a portion of the top surface 16Ab of the bottom shield 16A lying between the first sidewall SW1 and the third sidewall SW3. The second inclined portion Ra2 is constituted by the first bottom-surface portion of the bottom surface of the recessed portion 16Ac. The third inclined portion Ra3 is constituted by the second bottom-surface portion of the bottom surface of the recessed portion 16Ac. The second inclined portion Ra2 is closer to the top surface 1*a* of the substrate 1 than the first inclined portion Ra1. The third inclined portion Ra3 is closer to the top surface 1*a* of the substrate 1 than the second inclined portion Ra2.

Each of the first and third inclined portions Ra1 and Ra3 are inclined with respect to the top surface 1*a* of the substrate 1 in the following manner. The distance from the top surface 1*a* of the substrate 1 to any point on each of the first and third inclined portions Ra1 and Ra3 decreases with increasing distance from the point to the medium facing surface 80. The second inclined portion Ra2 is inclined with respect to the first inclined portion Ra1 such that an angle that the second inclined portion Ra2 forms with respect to the top surface 1*a* of the substrate 1 is greater than an angle that the first inclined portion Ra1 forms with respect to the top surface 1*a* of the substrate 1. The third inclined portion Ra3 is inclined with respect to the second inclined portion Ra2 such that an angle that the third inclined portion Ra3 forms with respect to the top surface 1*a* of the substrate 1 is smaller than the angle that the second inclined portion Ra2 forms with respect to the top surface 1*a* of the substrate 1. The angle that the first inclined portion Ra1 forms with respect to the top surface 1*a* of the substrate 1 falls within the range of 30° to 45°, for example. The angle that the second inclined portion Ra2 forms with respect to the top surface 1*a* of the substrate 1 falls within the range of 45° to 90°, for example. The angle that the third inclined portion Ra3 forms with respect to the top surface 1*a* of the substrate 1 falls within the range of 10° to 40°, for example.

Here, the boundary between the first inclined portion Ra1 and the second inclined portion Ra2 is denoted by the symbol Rb, as shown in FIG. 1, FIG. 3 and FIG. 5. The distance from each of the bottom edges E1L and E2L of the second and fourth sidewalls SW2 and SW4 to the medium facing surface 80 is substantially equal to the distance from the boundary Rb to the medium facing surface 80. The distance from each of the bottom edges E1L and E2L to the medium facing surface 80 and the distance from the boundary Rb to the medium facing surface 80 fall within the range of 10 to 60 nm.

As previously mentioned, the side shield height SH is approximately equal to the distance from each of the bottom edges E1L and E2L to the medium facing surface 80. The side shield height SH is thus approximately equal to the distance from the boundary Rb to the medium facing surface 80. The side shield height SH is thus approximately within the range of 10 to 60 nm.

As shown in FIG. 2 and FIG. 3, the bottom end 13L of the main pole 13 includes a first portion 13L1 opposed to the first inclined portion Ra1, a second portion 13L2 opposed to the second inclined portion Ra2, and a third portion 13L3 opposed to the third inclined portion Ra3. In the present embodiment, the first portion 13L1 is constituted by the bottom end 15Ac of the front portion 15A. The second portion 13L2 is constituted by the front end face 14*a* of the lower protrusion 14. The third portion 13L3 is constituted by a portion of the bottom surface 14*b* of the lower protrusion 14. The first portion 13L1 is opposed to the first inclined portion Ra1 with only the first gap layer 18 interposed therebetween, and is substantially parallel to the first inclined portion Ra1. The second portion 13L2 is opposed to the second inclined portion Ra2 with only the first gap layer 18 interposed therebetween, and is substantially parallel to the second inclined portion Ra2. The third portion 13L3 is opposed to the third inclined portion Ra3 with only the first gap layer 18 interposed therebetween, and is substantially parallel to the third inclined portion Ra3.

As shown in FIG. 3, the distance from the boundary between the first portion 13L1 and the second portion 13L2 to the medium facing surface 80 is approximately equal to the distance from the boundary Rb to the medium facing surface 80 plus the thickness of the first gap layer 18. The boundary between the first portion 13L1 and the second portion 13L2 is also the third end 14a1 of the front end face 14a of the lower protrusion 14. The distance from the third end 14a1 to the medium facing surface 80 falls within the range of 40 to 90 nm, for example.

As shown in FIG. 5, the third edge Ec is contiguous with the first edge Ea, and the fourth edge Ed is contiguous with the second edge Eb. The recessed portion 16Ac is thus in alignment with the first and second side shields 16C and 16D. A portion of the lower protrusion 14 of the main pole 13 is received in the recessed portion 16Ac. Thus, the lower protrusion 14 is also in alignment with the first and second side shields 16C and 16D.

A portion of the first side portion 14c of the lower protrusion 14 is opposed to the fifth sidewall SW5 of the recessed portion 16Ac. A portion of the second side portion 14d of the lower protrusion 14 is opposed to the sixth sidewall SW6 of the recessed portion 16Ac.

In the present embodiment, the recessed portion 55b of the nonmagnetic layer 55 receives another portion of the main pole 13. Another portion of the bottom surface 14b of the lower protrusion 14 is opposed to the bottom surface 55b1 of the recessed portion 55b. Another portion of the first side portion 14c of the lower protrusion 14 is opposed to the wall face 55b2 of the recessed portion 55b. Another portion of the second side portion 14d of the lower protrusion 14 is opposed to the wall face 55b3 of the recessed portion 55b.

A manufacturing method for the magnetic head according to the present embodiment will now be described. As shown in FIG. 6 and FIG. 7, the manufacturing method for the magnetic head according to the present embodiment first forms the insulating layer 2, the first read shield layer 3, and the first read shield gap film 4 in this order on the substrate 1. Next, the MR element 5 and leads (not illustrated) connected to the MR element 5 are formed on the first read shield gap film 4. The MR element 5 and the leads are then covered with the second read shield gap film 6. Then, the second read shield layer 7, the nonmagnetic layer 71, the middle shield layer 72, and the nonmagnetic layer 73 are formed in this order on the second read shield gap film 6.

Next, the coupling section 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the coupling section 31 is exposed. Next, the coupling section 32 and the lower core section 33 are formed on the coupling section 31 by frame plating, for example. The insulating film 52 is then formed over the entire top surface of the stack. Next, the lower coil portion 10 is formed by frame plating, for example. The insulating layer 53 is then formed over the entire top surface of the stack. The insulating film 52 and the insulating layer 53 are then polished by, for example, CMP, until the lower coil portion 10, the coupling section 32 and the lower core section 33 are exposed.

Next, the insulating layer 54 is formed over the entire top surface of the stack. The insulating layer 54 is then selectively etched to form therein a first opening for exposing the top surface of the coupling section 32, a second opening for exposing the top surface of the lower core section 33, and a third opening for exposing the coil connection 10E (see FIG. 8) of the lower coil portion 10. Then, an initial bottom shield, which will later become the bottom shield 16A, is formed on the coupling section 32 at the position of the first opening, the coupling section 34 is formed on the lower core section 33 at the position of the second opening, and the first connection layer (not illustrated) is formed on the coil connection 10E at the position of the third opening, by performing frame plating, for example. Next, an initial nonmagnetic layer, which will later become the nonmagnetic layer 55, is formed over the entire top surface of the stack. The initial nonmagnetic layer is then polished by, for example, CMP, until the initial bottom shield, the coupling section 34 and the first connection layer are exposed.

Figure 10:
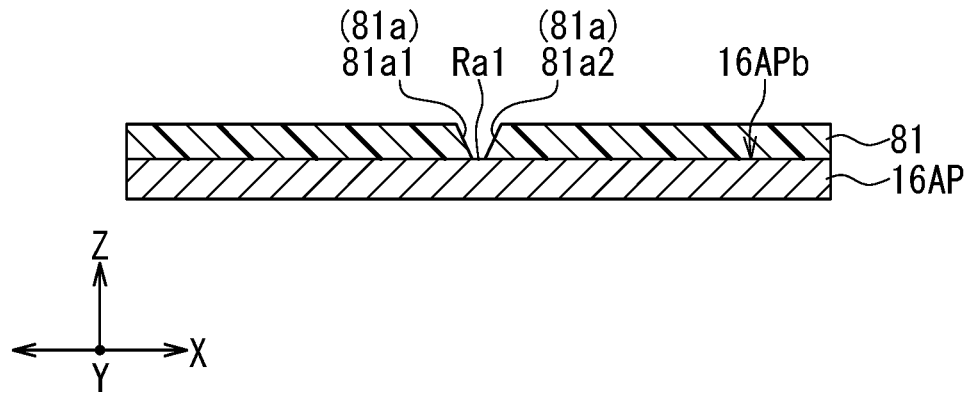
FIG. 10 is a cross-sectional view showing a step of a manufacturing method for the magnetic head according to the first embodiment of the invention.
Figure 11:
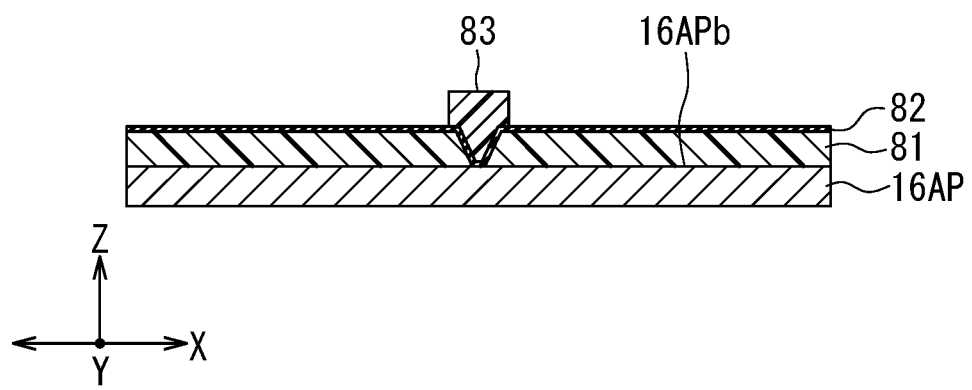
FIG. 11 is a cross-sectional view showing a step that follows the step shown in FIG. 10.
Figure 12:
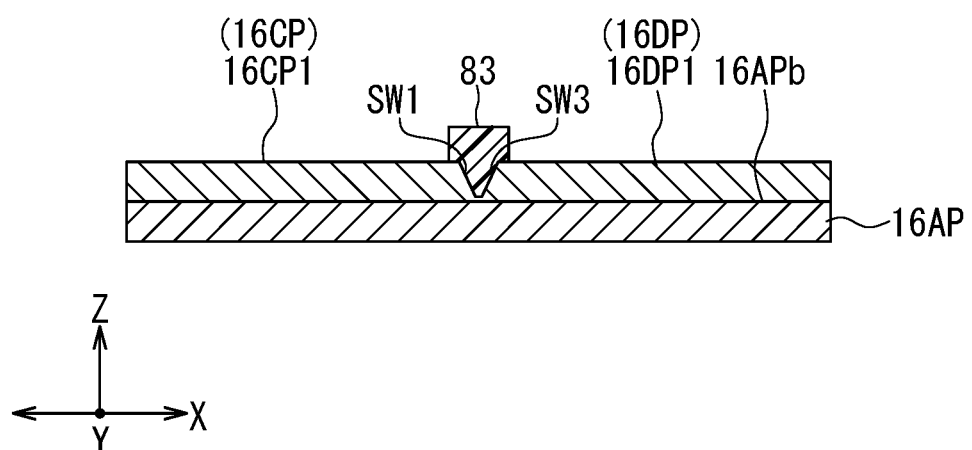
FIG. 12 is a cross-sectional view showing a step that follows the step shown in FIG. 11.

Reference is now made to FIG. 10 to FIG. 12 to describe a series of steps to be performed after the foregoing step up to the formation of first and second initial side shields which will later become the first and second side shields 16C and 16D. FIG. 10 to FIG. 12 each illustrate a stack of layers formed in the process of manufacturing the magnetic head. In FIG. 10 to FIG. 12, the symbol 16AP represents the initial bottom shield. FIG. 10 to FIG. 12 omit the illustration of portions that are closer to the substrate 1 relative to the initial bottom shield 16AP. FIG. 10 to FIG. 12 each illustrate a cross section of the stack taken at the position where the medium facing surface 80 is to be formed.

FIG. 10 shows a step to follow the polishing of the initial nonmagnetic layer. In this step, first, portions of the initial bottom shield 16AP and the initial nonmagnetic layer are taper-etched by, for example, ion beam etching (hereinafter referred to as IBE), to thereby provide the initial bottom shield 16AP with a top surface 16APb including the first inclined portion Ra1. Portions of the coupling section 34 and the first connection layer are also etched by this etching. Next, a seed layer (not illustrated) is formed on the initial bottom shield 16AP and the initial nonmagnetic layer by, for example, sputtering or ion beam deposition. Next, a first resist layer 81 is formed over the seed layer. The first resist layer 81 has an opening 81a shaped to correspond to the shape of the main pole 13 to be formed later. The first resist layer 81 also includes portions shaped to correspond to the first and second side shields 16C and 16D to be formed later.

Now, a method of forming the first resist layer 81 will be described in detail. First, a photoresist layer of a positive photoresist is formed over the entire top surface of the stack. The photoresist layer is formed such that its top surface is higher in level than the top surfaces of the first and second side shields 16C and 16D to be formed later. Next, the photoresist layer is selectively exposed to light through a photomask. When exposing the photoresist layer to light, optical proximity correction (hereinafter referred to as OPC) may be employed to form the first resist layer 81 into a shape closer to a desired one. In OPC, the pattern of the photomask is determined so that the photoresist layer to be patterned by photolithography will have a shape closer to a desired one. The photomask has a light-transmitting portion which passes the light for exposure therethrough, and a light-blocking portion which blocks the light for exposure. The light-transmitting portion of the photomask includes a portion shaped to correspond to the planar shape of the main pole 13 to be formed later. The light-blocking portion of the photomask includes a portion shaped to correspond to the planar shape of the first and second side shields 16C and 16D to be formed later. The exposed photoresist layer is then developed. As a result of the exposure, the area of the photoresist layer irradiated with the light having passed through the light-transmitting portion of the photomask becomes soluble in a developing solution, while the other area remains insoluble in the developing solution. The photoresist layer remaining after the development makes the first resist layer 81.

The opening 81a of the first resist layer 81 has a wall face 81a1 including a portion corresponding to the first sidewall SW1 of the first side shield 16C to be formed later, and a wall face 81a2 including a portion corresponding to the third sidewall SW3 of the second side shield 16D to be formed later. In this step, the photoresist layer is patterned so that both of the wall faces 81a1 and 81a2 become inclined with respect to a direction perpendicular to the top surface 1a (see FIG. 6 and FIG. 7) of the substrate 1 and that the distance between the portion of the wall face 81a1 corresponding to the first sidewall SW1 and the portion of the wall face 81a2 corresponding to the third sidewall SW3 decreases with increasing proximity to the top surface 1a of the substrate 1. Such patterning can be accomplished by using a photoresist layer that consists of a lower layer of low sensitivity and an upper layer of high sensitivity, for example.

FIG. 11 shows the next step. In this step, first, a separating film 82 of a nonmagnetic material is formed to cover the first resist layer 81. The separating film 82 is intended to prevent the first resist layer 81 of a positive photoresist from being mixed with a photoresist layer of a negative photoresist that will be formed later. The separating film 82 has a thickness in the range of 5 to 20 nm, for example. The separating film 82 may be formed of alumina or a synthetic resin, for example. Where alumina is selected as the material for the separating film 82, the separating film 82 is formed by ion beam deposition, for example.

Next, a second resist layer 83 is formed on the separating film 82 by patterning a photoresist layer of a negative photoresist by photolithography. The second resist layer 83 is shaped to correspond to the shape of the main pole 13 to be formed later. A method of forming the second resist layer 83 will now be described in detail. First, a photoresist layer of a negative photoresist is formed over the entire top surface of the stack. The photoresist layer is formed such that its top surface is higher in level than the top surface of a portion of the separating film 82 that lies on the first resist layer 81. Next, the photoresist layer is selectively exposed to light through a photomask. The photomask has a light-transmitting portion which passes the light for exposure therethrough, and a light-blocking portion which blocks the light for exposure, like the photomask that was used when forming the first resist layer 81. The light-transmitting portion of the photomask includes a portion shaped to correspond to the planar shape of the main pole 13 to be formed later. The exposed photoresist layer is then developed. As a result of the exposure, the area of the photoresist layer irradiated with the light having passed through the light-transmitting portion of the photomask becomes insoluble in a developing solution, while the other area remains soluble in the developing solution. The photoresist layer remaining after the development makes the second resist layer 83. In this step, OPC may be employed as in the step of forming the first resist layer 81.

FIG. 12 shows the next step. In this step, first, portions of the separating film 82 that are not covered with the second resist layer 83 are removed by wet etching, for example. Next, the first and second resist layers 81 and 83 are exposed to light and then the first resist layer 81 is removed. More specifically, first, the entire top surface of the stack is exposed to light. The exposure causes the first resist layer 81 of a positive photoresist to become soluble in a developing solution, and allows the second resist layer 83 of a negative photoresist to remain insoluble in the developing solution. Next, the first resist layer 81 is removed using an alkaline developing solution, for example. In this step, portions of the separating film 82 extending along the wall faces of the second resist layer 83 are also removed when or after the first resist layer 81 is removed. In this step, a portion of the separating film 82 lying under a narrow portion of the second resist layer 83 may also be removed. Even in such a case, the second resist layer 83 will not peel away since a portion of the separating film 82 lying under a thick portion of the second resist layer 83 remains.

Next, a first initial side shield 16CP, which will later become the first side shield 16C, and a second initial side shield 16DP, which will later become the second side shield 16D, are formed over the initial bottom shield 16AP and the initial nonmagnetic layer by performing plating, using the non-illustrated seed layer as an electrode and a seed. Then, the second resist layer 83 and the separating film 82 are removed.

In the present embodiment, the first initial side shield 16CP includes a first pre-side-shield portion 16CP1 to become the first side shield 16C, and a first portion to be removed, which will be removed in an etching step to be described later. The first pre-side-shield portion 16CP1 has the first sidewall SW1 of the first side shield 16C to be formed later. The first portion to be removed has a seventh sidewall contiguous with the first sidewall SW1.

The second initial side shield 16DP includes a second pre-side-shield portion 16DP1 to become the second side shield 16D, and a second portion to be removed, which will be removed in the etching step to be described later. The second pre-side-shield portion 16DP1 has the third sidewall SW3 of the second side shield 16D to be formed later. The second portion to be removed has an eighth sidewall contiguous with the third sidewall SW3.

Next, a description will be given of a patterning step to be performed after the second resist layer 83 and the separating film 82 are removed. The patterning step is a step of patterning the first initial side shield 16CP, the second initial side shield 16DP and the initial bottom shield 16AP so as to provide the first initial side shield 16CP with the second sidewall SW2, provide the second initial side shield 16DP with the fourth sidewall SW4, and provide the top surface 16APb of the initial bottom shield 16AP with the second inclined portion Ra2.

Figure 13:
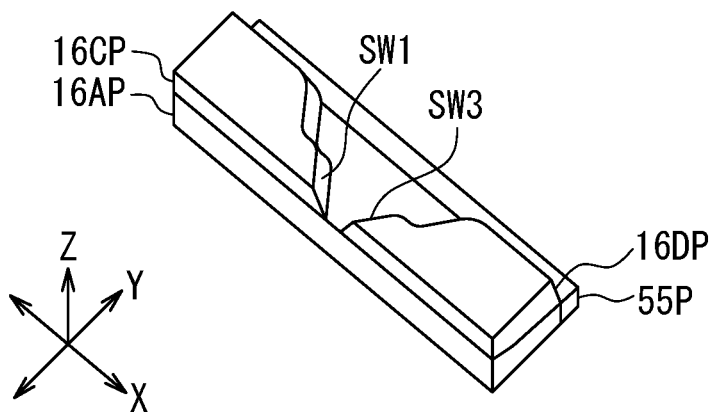
FIG. 13 is a perspective view for explaining an overview of a patterning step of the manufacturing method for the magnetic head according to the first embodiment of the invention.
Figure 14:
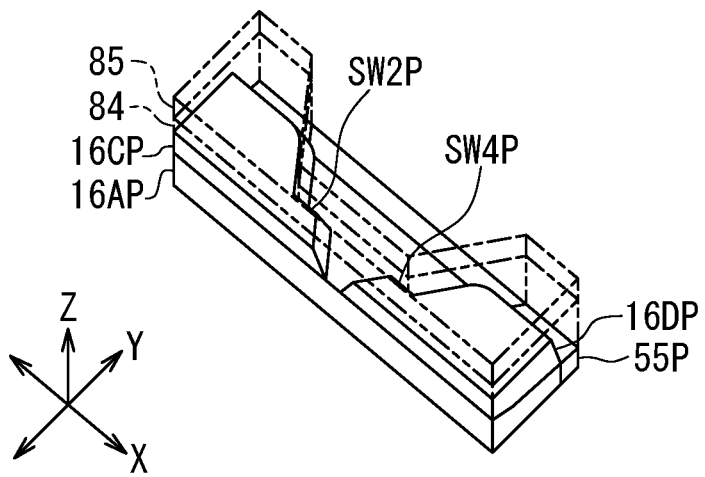
FIG. 14 is a perspective view for explaining an overview of a first etching step of the manufacturing method for the magnetic head according to the first embodiment of the invention.
Figure 15:
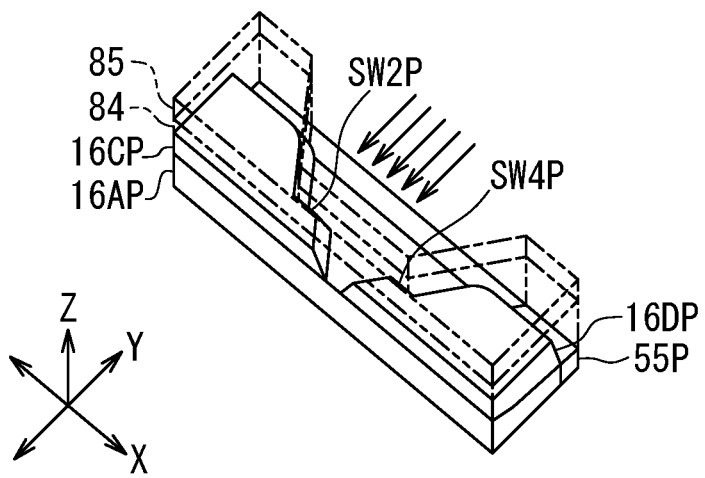
FIG. 15 is a perspective view for explaining an overview of a second etching step of the manufacturing method for the magnetic head according to the first embodiment of the invention.

First, an overview of the patterning step will be described with reference to FIG. 13 to FIG. 15. FIG. 13 to FIG. 15 each illustrate a stack of layers formed in the process of manufacturing the magnetic head. In FIG. 13 to FIG. 15 the symbol 55P represents the initial nonmagnetic layer. FIG. 13 to FIG. 15 omit the illustration of portions that are closer to the substrate 1 relative to the initial bottom shield 16AP and the initial nonmagnetic layer 55P. FIG. 13 shows the stack having undergone the removal of the second resist layer 83 and the separating film 82.

The patterning step starts with forming a planarization layer 84 to cover the stack including the first and second initial side shields 16CP and 16DP, as shown in FIG. 14. A mask 85 is then formed on the planarization layer. Then, a first etching step is performed. The first etching step is a step of etching a portion of each of the first initial side shield 16CP and the second initial side shield 16DP so as to provide the first initial side shield 16CP with an initial second sidewall SW2P and provide the second initial side shield 16DP with an initial fourth sidewall SW4P. The first etching step etches a portion of the planarization layer 84 as well as the portion of each of the first and second initial side shields 16CP and 16DP using the mask 85. In the present embodiment, the first etching step is performed by reactive ion etching (hereinafter referred to as RIE).

FIG. 15 shows the next step. In this step, a second etching step is performed. The second etching step is a step of etching a portion of each of the first initial side shield 16CP, the second initial side shield 16DP, and the initial bottom shield 16AP so as to make the initial second sidewall SW2P into the second sidewall SW2, make the initial fourth sidewall SW4P into the fourth sidewall SW4, and provide the top surface 16APb of the initial bottom shield 16AP with the second inclined portion Ra2. In the present embodiment, the bottom Ra of the receiving section R includes the third inclined portion Ra3 aside from the second inclined portion Ra2. Thus, in the present embodiment the second etching step etches the portion of the initial bottom shield 16AP so as to provide the top surface 16APb of the initial bottom shield 16AP with the second and third inclined portions Ra2 and Ra3.

In the present embodiment, the second etching step is performed by IBE. The arrows in FIG. 15 indicate the direction of travel of ion beams. IBE is performed such that the ion beams are projected onto the initial second sidewall SW2P and the initial fourth sidewall SW4P.

Now, the patterning step will be described in detail with reference to FIG. 16A to FIG. 23B. FIG. 16A to FIG. 23B each illustrate a stack of layers formed in the process of manufacturing the magnetic head. FIG. 16A to FIG. 23B omit the illustration of portions that are closer to the substrate 1 relative to the initial bottom shield 16AP and the initial nonmagnetic layer 55P.

Fig. nA (n is an integer between 16 and 23 inclusive) shows a cross section perpendicular to the medium facing surface 80 and to the top surface 1a of the substrate 1, the cross section intersecting the second sidewall SW2 and the recessed portions 16Ac and 55b to be formed later. Fig. nB shows a cross section perpendicular to the medium facing surface 80 and to the top surface 1a of the substrate 1, the cross section intersecting the end face 13a of the main pole 13 to be formed later. In each of FIG. 16A to FIG. 23B, the symbol "ABS" indicates the position at which the medium facing surface 80 is to be formed.

Figure 16A:
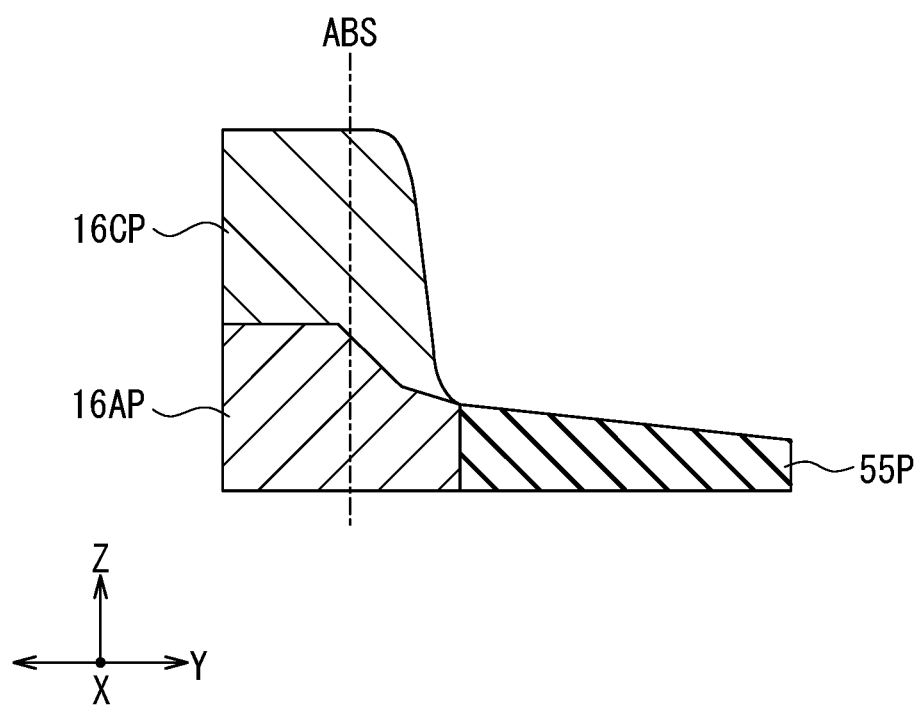
FIG. 16A and FIG. 16B are cross-sectional views showing another step of the manufacturing method for the magnetic head according to the first embodiment of the invention.
Figure 16B:
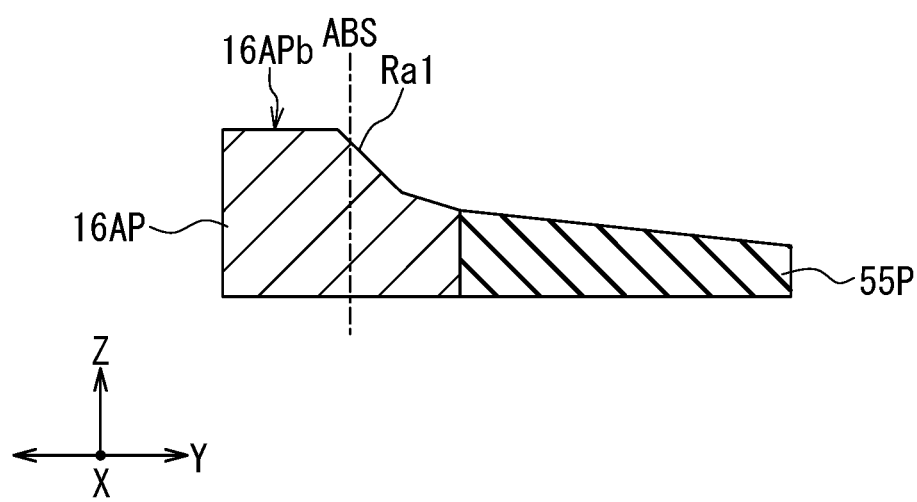
Figure 17A:
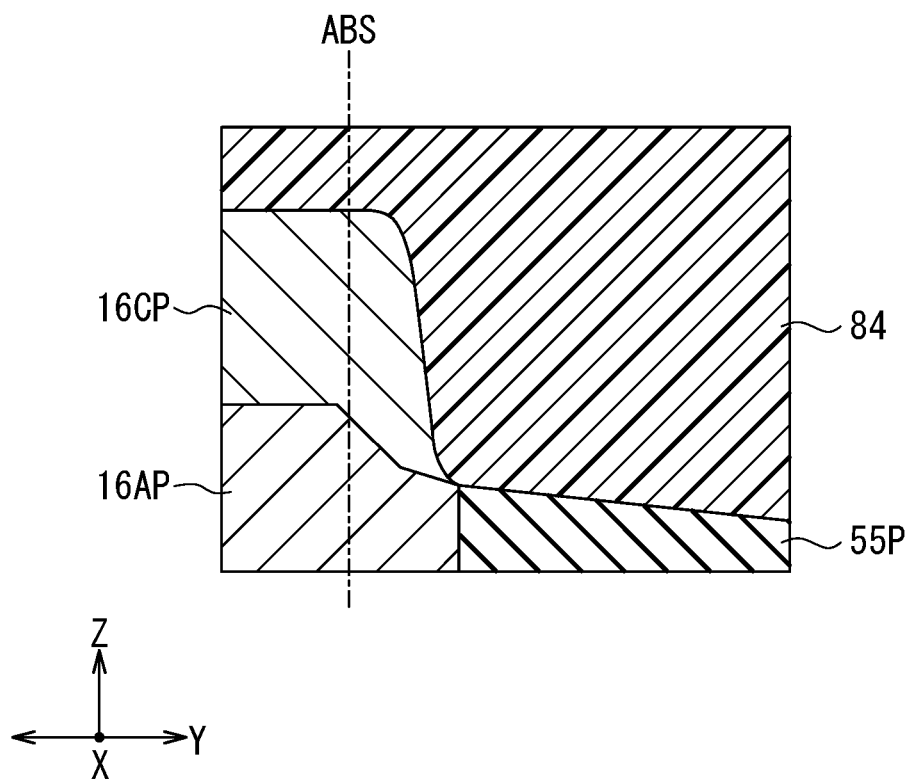
FIG. 17A and FIG. 17B are cross-sectional views showing a step that follows the step shown in FIG. 16A and FIG. 16B.
Figure 17B:
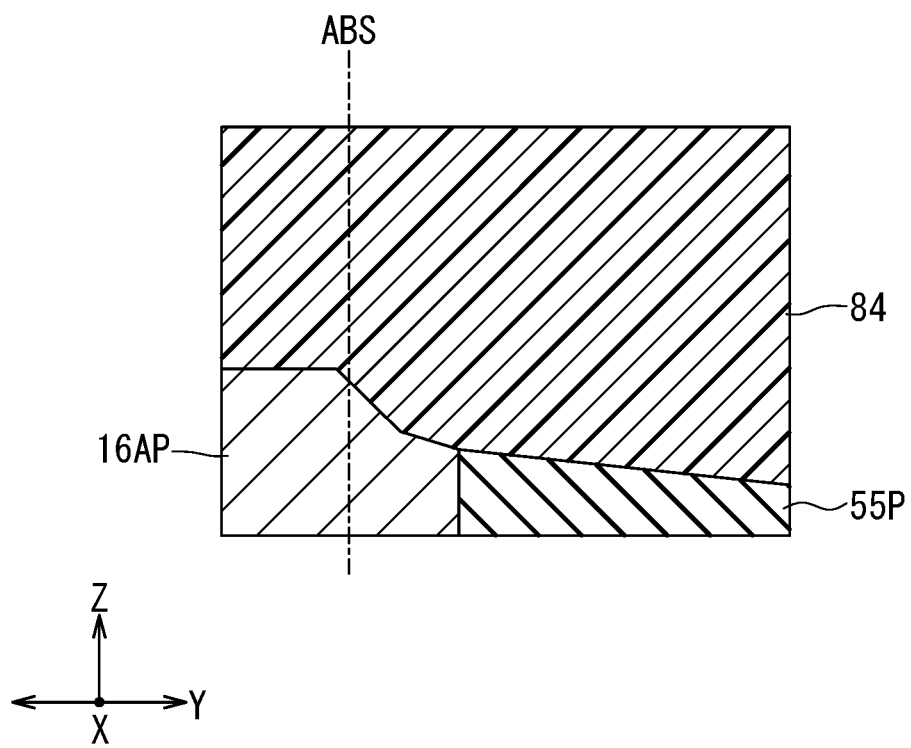

FIG. 16A and FIG. 16B show the stack having undergone the removal of the second resist layer 83 and the separating film 82. FIG. 17A and FIG. 17B show the next step. In this step, the planarization layer 84 is formed to cover the stack including the initial bottom shield 16AP, the first initial side shield 16CP, the second initial side shield 16DP, and the initial nonmagnetic layer 55P. The planarization layer 84 is formed by, for example, initially coating the stack with a photoresist layer and then curing the photoresist layer by heat treatment at 300° C. for 30 minutes.

Figure 18A:
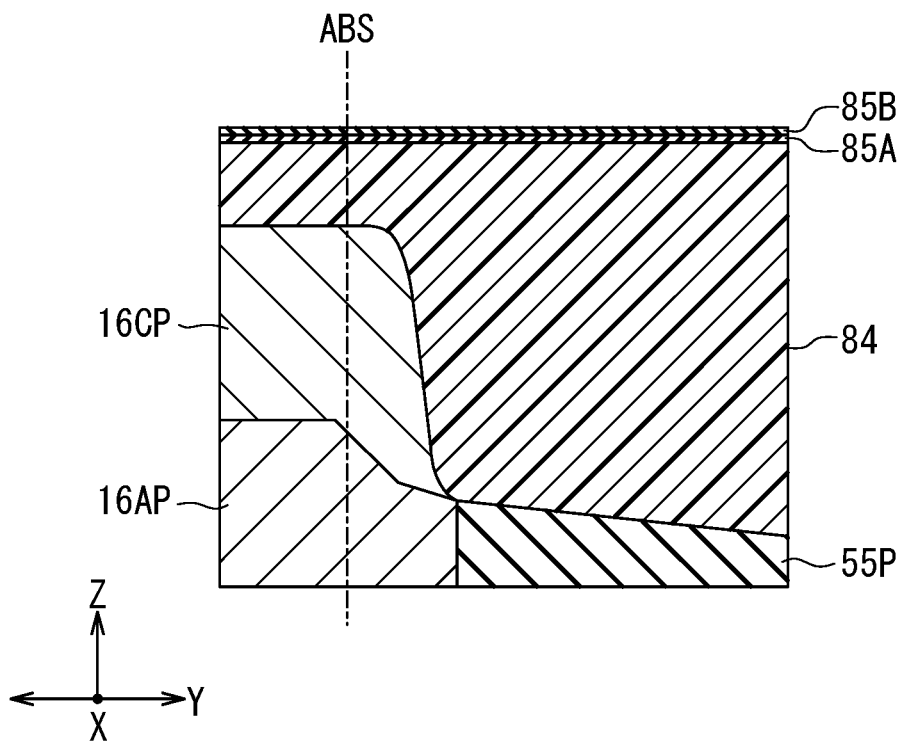
FIG. 18A and FIG. 18B are cross-sectional views showing a step that follows the step shown in FIG. 17A and FIG. 17B.
Figure 18B:
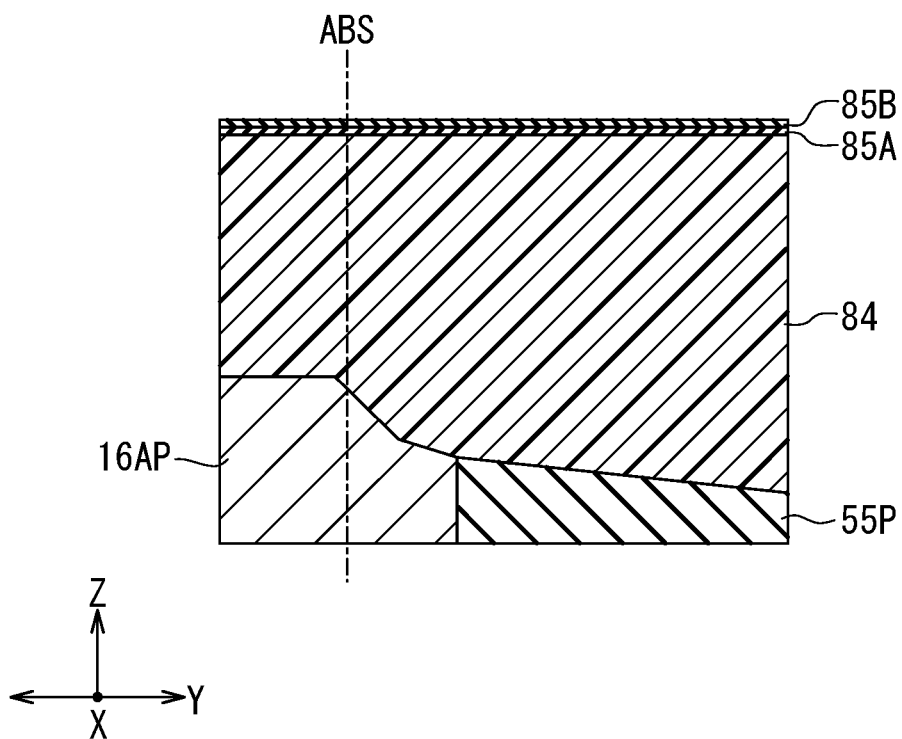

FIG. 18A and FIG. 18B show the next step. In this step, first, a first inorganic material layer 85A and a second inorganic material layer 85B, each made of an inorganic material, are formed in this order on the planarization layer 84. The first inorganic material layer 85A is made of alumina, for example. The second inorganic material layer 85B is made of tantalum oxide ($Ta_2O_5$), for example.

Figure 19A:
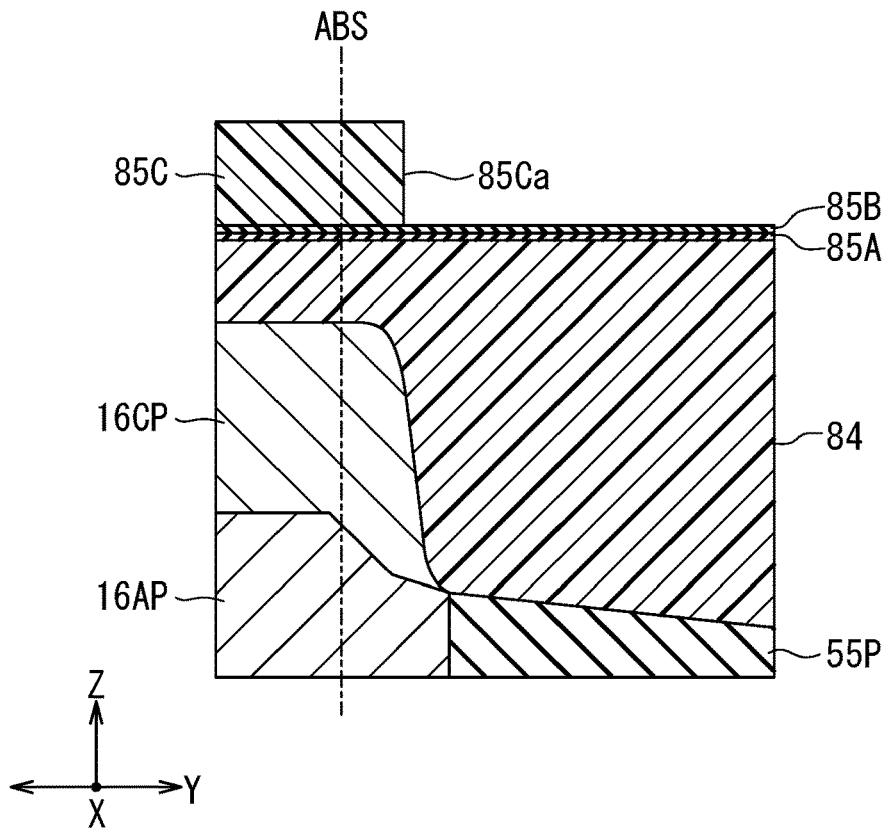
FIG. 19A and FIG. 19B are cross-sectional views showing a step that follows the step shown in FIG. 18A and FIG. 18B.
Figure 19B:
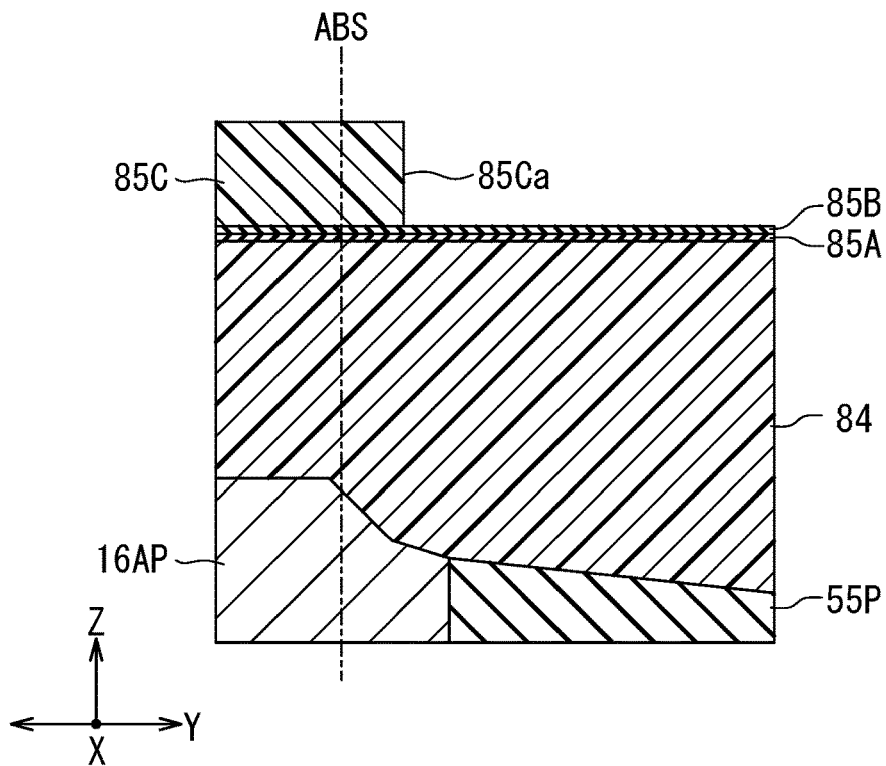

FIG. 19A and FIG. 19B show the next step. In this step, a photoresist mask 85C is formed on the second inorganic material layer 85B. The photoresist mask 85C is located above the first and second pre-side-shield portions 16CP1 and 16DP1 (see FIG. 12) of the first and second initial side shields 16CP and 16DP. The photoresist mask 85C has a wall face 85Ca including a portion that defines the position of the initial second sidewall and the initial fourth sidewall to be formed later. The photoresist mask 85C is formed by patterning a photoresist layer by photolithography, for example.

Figure 20A:
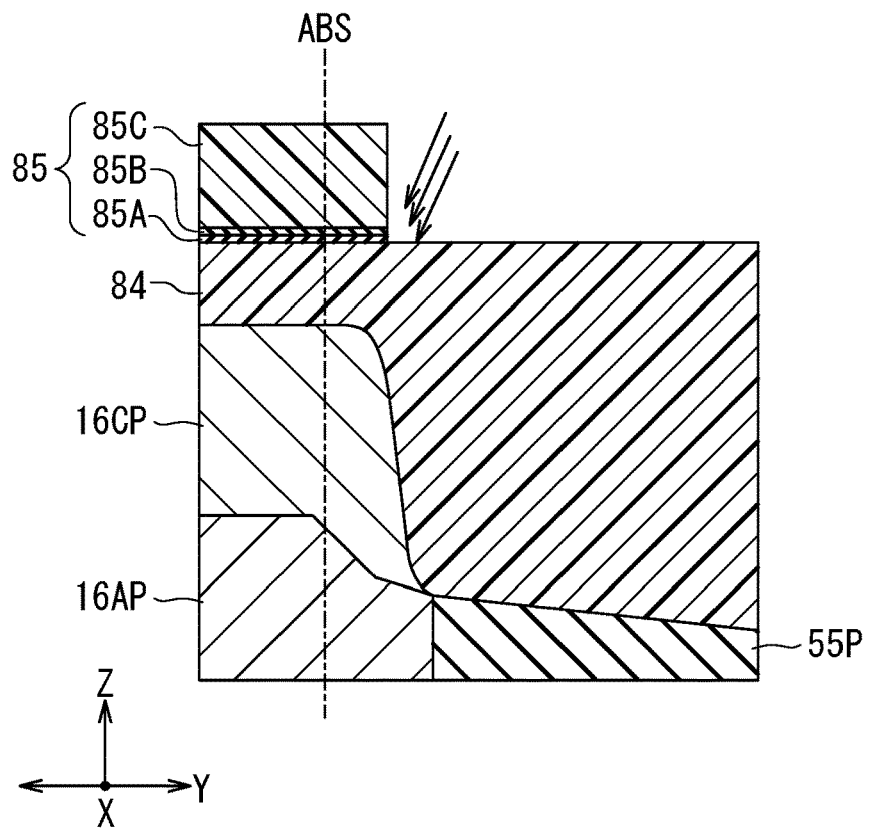
FIG. 20A and FIG. 20B are cross-sectional views showing a step that follows the step shown in FIG. 19A and FIG. 19B.
Figure 20B:
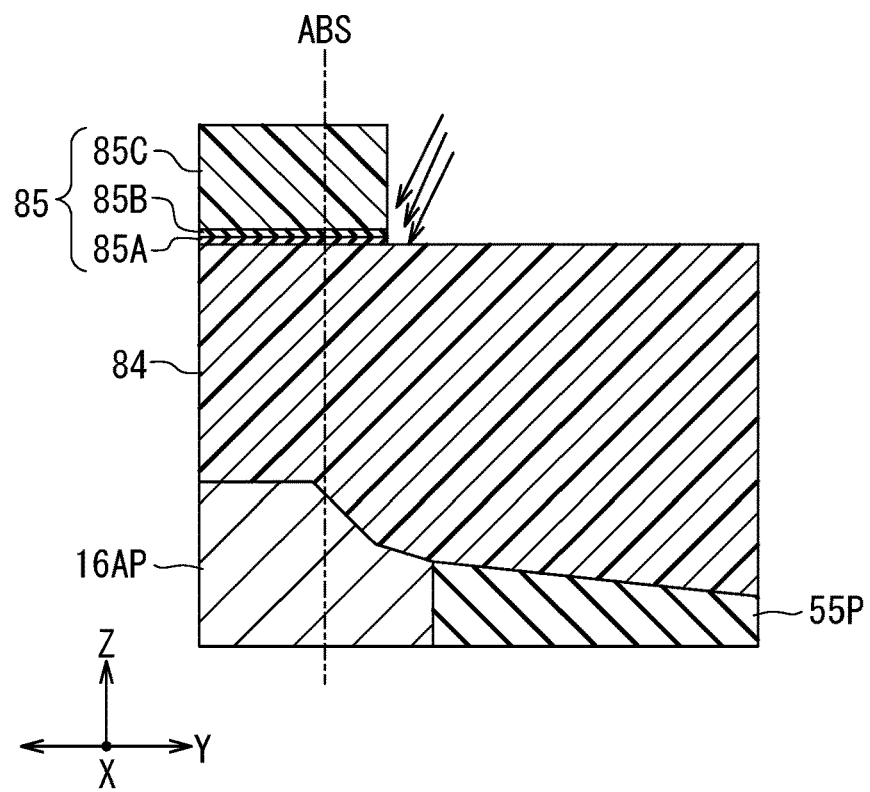

FIG. 20A and FIG. 20B show the next step. In this step, the first and second inorganic material layers 85A and 85B are patterned by, for example, IBE such that portions of the first and second inorganic material layers 85A and 85B that are not covered with the photoresist mask 85C are removed. The arrows in FIG. 20A and FIG. 20B indicate the direction of travel of ion beams. The first and second inorganic material layers 85A and 85B thus patterned and the photoresist mask 85C constitute the mask 85. The mask 85 is on the planarization layer 84. The first and second inorganic material layers 85A and 85B are intended to prevent the photoresist mask 85C from getting mixed with the planarization layer 84 and to precisely define the shape of the bottom surface of the mask 85 touching the top surface of the planarization layer 84.

Figure 21A:
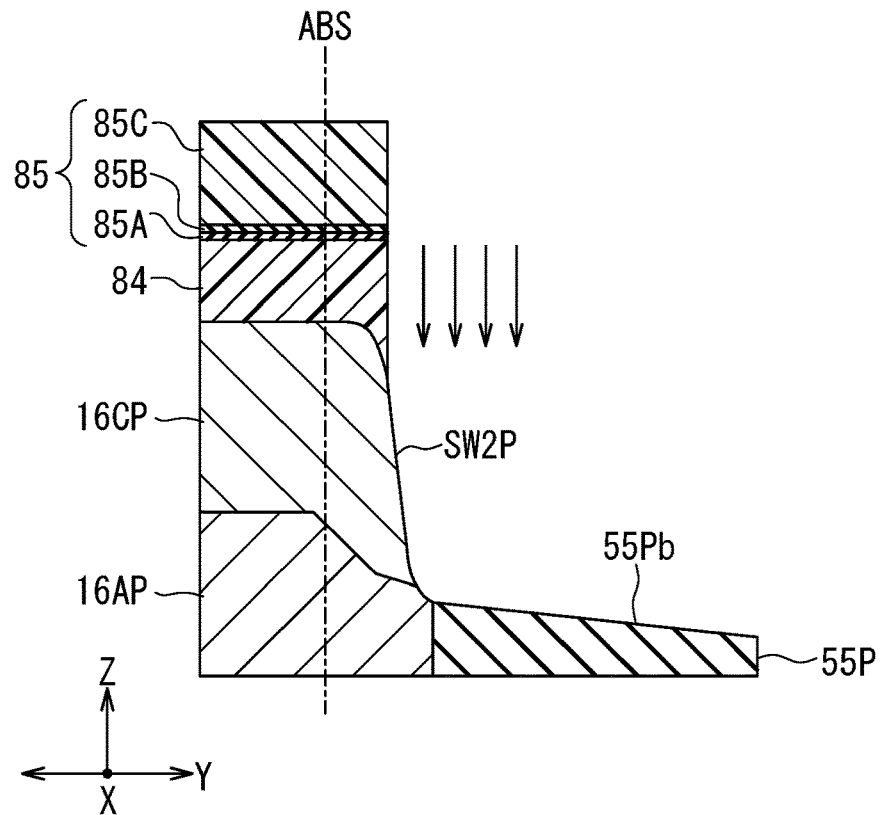
FIG. 21A and FIG. 21B are cross-sectional views showing a step that follows the step shown in FIG. 20A and FIG. 20B.
Figure 21B:
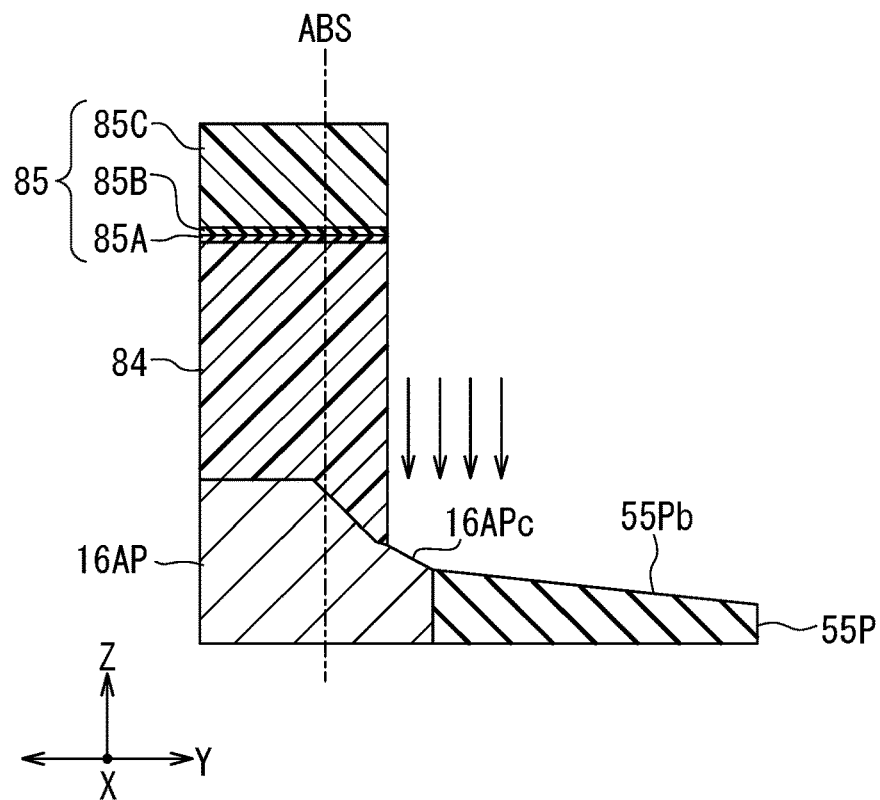

FIG. 21A and FIG. 21B show the next step. In this step, the foregoing first etching step is performed. As described above, in the present embodiment the first etching step is performed by RIE. For example, a gas containing $CF_4$ is used as an etching gas in the first etching step. The arrows in FIG. 21A and FIG. 21B indicate the direction of travel of ions in plasma.

The first etching step etches portions of the first and second initial side shields 16CP and 16DP that are not covered with the mask 85, i.e., the first and second portions to be removed, and portions of the initial bottom shield 16AP and the initial nonmagnetic layer 55P that are not covered with the first and second initial side shields 16CP and 16DP and the mask 85. As a result of the first etching step, the first initial side shield 16CP is provided with the initial second sidewall SW2P, and the second initial side shield 16DP is provided with the initial fourth sidewall SW4P. The first etching step further provides the top surface of the initial bottom shield 16AP with an initial recessed portion 16APc, and provides the top surface of the initial nonmagnetic layer 55P with an initial recessed portion 55Pb.

Figure 22A:
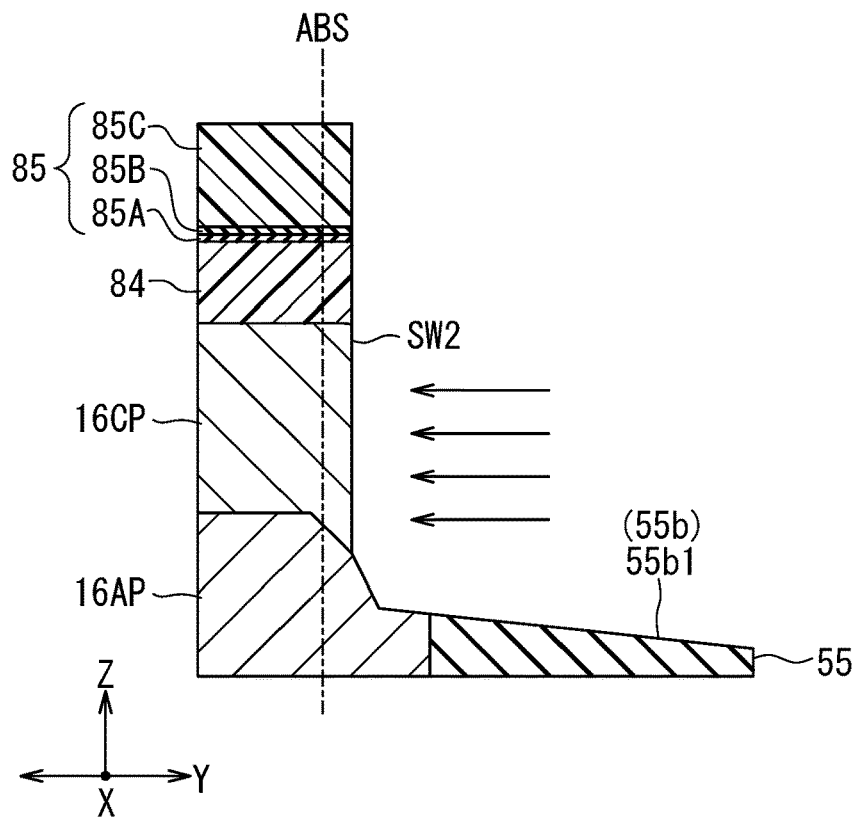
FIG. 22A and FIG. 22B are cross-sectional views showing a step that follows the step shown in FIG. 21A and FIG. 21B.
Figure 22B:
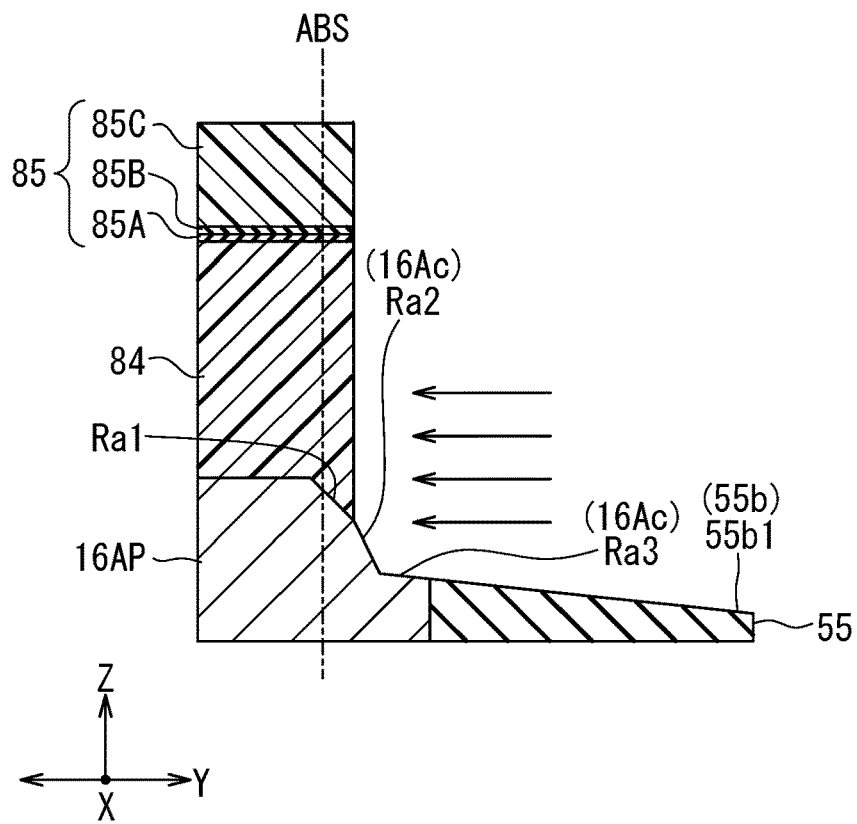

FIG. 22A and FIG. 22B show the next step. In this step, the foregoing second etching step is performed. As described above, in the present embodiment the second etching step is performed by IBE. The arrows in FIG. 22A and FIG. 22B indicate the direction of travel of ion beams. In the second etching step, the angle that the direction of travel of the ion beams forms with respect to a direction perpendicular to the top surface 1a of the substrate 1 is varied over the range from 0° to 90°, preferably within the range from 45° to 65°.

The second etching step etches a portion of the initial bottom shield 16AP to thereby provide the top surface of the initial bottom shield 16AP with the second and third inclined portions Ra2 and Ra3. This makes the initial recessed portion 16APc into the recessed portion 16Ac. The second etching step also etches a portion of the initial nonmagnetic layer 55P. This makes the initial recessed portion 55Pb into the recessed portion 55b, thus making the initial nonmagnetic layer 55P into the nonmagnetic layer 55.

Figure 23A:
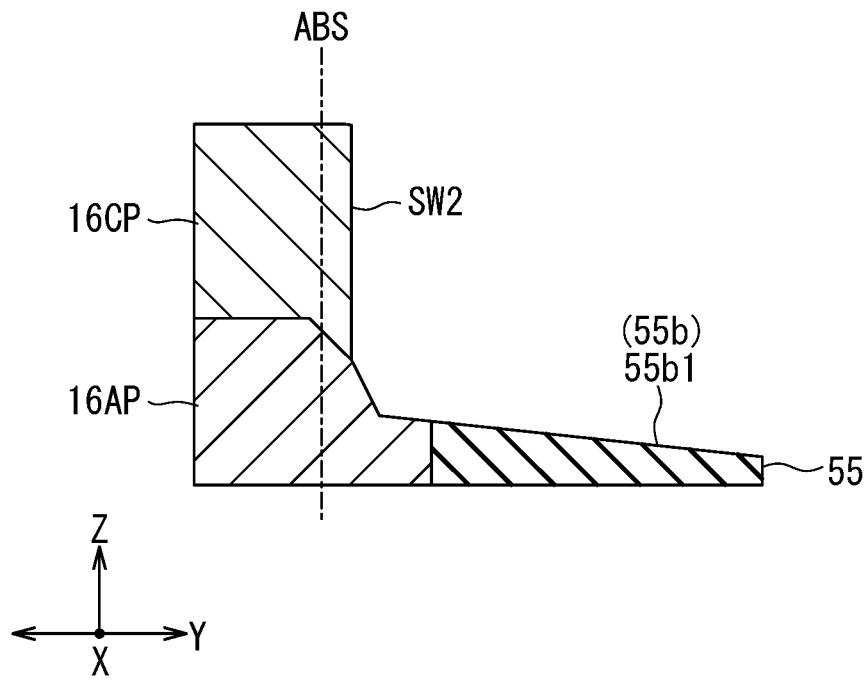
FIG. 23A and FIG. 23B are cross-sectional views showing a step that follows the step shown in FIG. 22A and FIG. 22B.
Figure 23B:
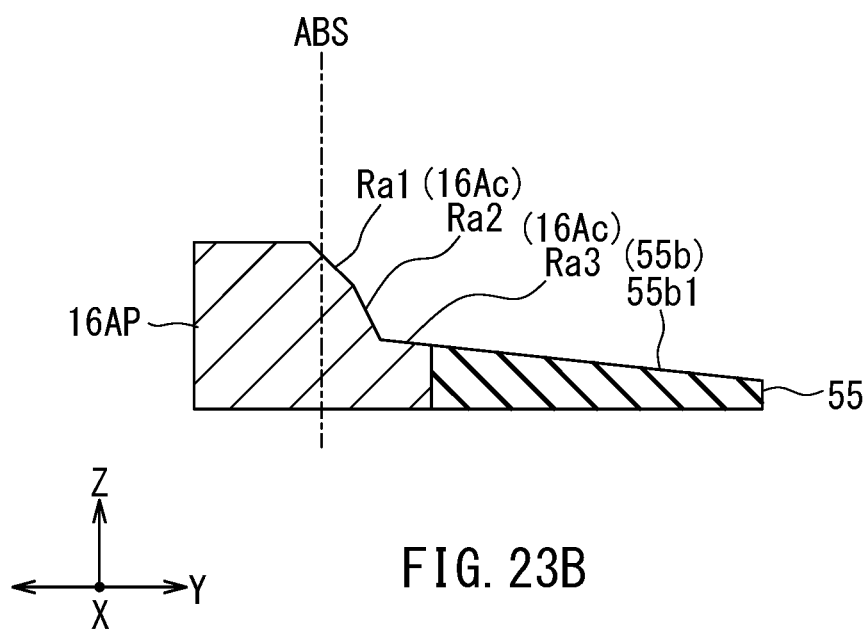

Next, as shown in FIG. 23A and FIG. 23B, the planarization layer 84 and the mask 85 are removed.

Steps to follow the patterning step will now be described with reference to FIG. 1, FIG. 2, and FIG. 5 to FIG. 7. First, the first gap layer 18 is formed over the entire top surface of the stack. Where alumina is selected as the material of the first gap layer 18, the first gap layer 18 is formed by atomic layer deposition (ALD), for example. Where Ru is selected as the material of the first gap layer 18, the first gap layer 18 is formed by chemical vapor deposition (CVD), for example. The first gap layer 18 is then selectively etched to form therein an opening for exposing the top surface of the coupling section 34 and an opening for exposing the top surface of the first connection layer.

Next, a photoresist layer is formed over the entire top surface of the stack and then the photoresist layer is patterned to form a mold. The mold is formed such that its top surface is higher in level than the top surface 13T of the main pole 13 to be formed later. The mold has a first opening to receive an initial main pole which will become the main pole 13 later, and a second opening to receive the second connection layer (not illustrated). The first opening has a first inner wall which defines the shape of the fifth side surface S5, and a second inner wall which defines the shape of the sixth side surface S6. When viewed from above, the first and second inner walls are located on outer sides relative to the positions at which the first and third side surfaces S1 and S3 are to formed.

Next, the initial main pole is formed to be received in the first opening by performing plating using the mold. Portions of the initial main pole that are formed to be received in the recessed portions 16Ac and 55b will constitute the lower protrusion 14 of the main pole 13 later. A portion of the initial main pole that is formed between the first sidewall SW1 of the first initial side shield 16CP and the third sidewall SW3 of the second initial side shield 16DP will later become the front portion 15A of the main body 15 of the main pole 13. A portion of the initial main pole that lies on the portions to become the lower protrusion 14 and lies off the first and second recessed portions 16Ac and 55b will later become the rear portion 15B of the main body 15 of the main pole 13.

The initial main pole has the first to sixth side surfaces S1 to S6, the bottom end 15Ac of the front portion 15A, and the front end face 14a, the bottom surface 14b and the side portions 14c and 14d of the lower protrusion 14. The shape of the first side surface S1 is defined by the first sidewall SW1 of the first initial side shield 16CP and a portion of the first gap layer 18 extending along the first sidewall SW1. The shape of the third side surface S3 is defined by the third sidewall SW3 of the second initial side shield 16DP and a portion of the first gap layer 18 extending along the third sidewall SW3.

The shape of the second side surface S2 is defined by the second sidewall SW2 of the first initial side shield 16CP and a portion of the first gap layer 18 extending along the second sidewall SW2. The shape of the fourth side surface S4 is defined by the fourth sidewall SW4 of the second initial side shield 16DP and a portion of the first gap layer 18 extending along the fourth sidewall SW4. The shape of the fifth side surface S5 is defined by the first inner wall of the mold. The shape of the sixth side surface S6 is defined by the second inner wall of the mold.

The shape of the bottom end 15Ac is defined by the first inclined portion Ra1 and a portion of the first gap layer 18 extending along the first inclined portion Ra1. The shape of the front end face 14a is defined by the second inclined portion Ra2 and a portion of the first gap layer 18 extending along the second inclined portion Ra2. The shape of the bottom surface 14b is defined by the third inclined portion Ra3, the bottom surface 55b1 of the recessed portion 55b, and a portion of the first gap layer 18 extending along the third inclined portion Ra3 and the bottom surface 55b1. The shape of the first side portion 14c is defined by the fifth sidewall SW5 of the recessed portion 16Ac, the wall face 55b2 of the recessed portion 55b, and a portion of the first gap layer 18 extending along the fifth sidewall SW5 and the wall face 55b2. The shape of the second side portion 14d is defined by the sixth sidewall SW6 of the recessed portion 16Ac, the wall face 55b3 of the recessed portion 55b, and a portion of the first gap layer 18 extending along the sixth sidewall SW6 and the wall face 55b3.

The second connection layer is formed on the first connection layer by performing plating using the mold. The initial main pole and the second connection layer are formed such that their top surfaces are higher in level than portions of the first gap layer 18 lying on the initial side shields 16CP and 16DP. The mold is then removed.

Next, the nonmagnetic layer 60 is formed over the entire top surface of the stack. The nonmagnetic layer 60 is then polished until the top surfaces of the first and second initial side shields 16CP and 16DP are exposed. Next, the nonmagnetic metal layer 58 is formed over the initial main pole and the initial side shields 16CP and 16DP. Then, a portion of each of the initial main pole, the initial side shields 16CP and 16DP, the first gap layer 18 and the nonmagnetic layer 60 is etched by, for example, IBE using the nonmagnetic metal layer 58 so as to provide the initial main pole with the inclined portion of the first portion 15Ab of the top surface 13T of the main pole 13. After the etching, a portion of the top surface of the initial main pole that is covered with the nonmagnetic metal layer 58 makes the flat portion of the first portion 15Ab of the top surface 13T and the second portion 15Bb of the top surface 13T.

Next, the second gap layer 19 is formed over the entire top surface of the stack by sputtering or chemical vapor deposition, for example. Then, the nonmagnetic layer 61 is formed on the second gap layer 19. The nonmagnetic layer 61 may be formed by a lift-off process, or by initially forming a nonmagnetic film on the second gap layer 19 and then etching a portion of the nonmagnetic film. The second gap layer 19, the nonmagnetic metal layer 58 and the nonmagnetic layer 61 are then selectively etched by, for example, IBE, so that a portion of the top surface of the initial main pole, a portion of the top surface of each of the initial side shields 16CP and 16DP, and the top surface of the second connection layer are exposed. Next, an initial top shield, which will later become the top shield 16B, is formed over the initial side shields 16CP and 16DP, the second gap layer 19 and the nonmagnetic layer 61, and the upper core section 41 is formed on the initial main pole, by performing frame plating, for example.

Next, the insulating film 62 is formed over the entire top surface of the stack. The insulating film 62 is then selectively etched to form therein an opening for exposing the top surface of the second connection layer. Next, the upper coil portion 20 is formed by frame plating, for example. The insulating layer 63 is then formed over the entire top surface of the stack. The insulating film 62 and the insulating layer 63 are then polished by, for example, CMP, until the upper coil portion 20, the initial top shield and the upper core section 41 are exposed.

Next, the insulating layer 64 is formed over the entire top surface of the stack. The insulating layer 64 is then selectively etched to form therein an opening for exposing the top surface of the initial top shield and an opening for exposing the top surface of the upper core section 41. Next, the coupling section 42 is formed by frame plating, for example. The initial top shield and the coupling section 42 are then etched by, for example, RIE or IBE so as to provide the initial top shield with the connecting surface mentioned previously and provide the coupling section 42 with the end face mentioned previously.

Next, the protective layer 70 is formed to cover the entire top surface of the stack. Wiring, terminals and other components are then formed on the protective layer 70, and the substrate 1 is cut near the position ABS at which the medium facing surface 80 is to be formed. The cut surface is then polished into the medium facing surface 80 so that the initial bottom shield 16AP becomes the bottom shield 16A, the initial top shield becomes the top shield 16B, the first initial side shield 16CP becomes the first side shield 16C, the second initial side shield 16DP becomes the second side shield 16D, and the initial main pole becomes the main pole 13. Then, fabrication of flying rails and other processes are performed to complete the magnetic head.

Now, functions and effects specific to the magnetic head according to the present embodiment will be described. In the present embodiment, the write shield 16 includes the bottom shield 16A, the top shield 16B, the first side shield 16C, and the second side shield 16D. The present embodiment makes it possible that, in regions on opposite sides of the end face 13a of the main pole 13 in the track width direction (the X direction) and regions on the front and rear sides in the direction of travel of the recording medium 90 (the Z direction) relative to the end face 13a of the main pole 13, a magnetic flux that is produced from the end face 13a of the main pole 13 and spreads in directions other than a direction perpendicular to the plane of the recording medium 90 can be captured and thereby prevented from reaching the recording medium 90. By virtue of this, the present embodiment makes it possible to prevent the occurrence of unwanted erasure.

Further, in the present embodiment, the main pole 13 has the first to fourth side surfaces S1 to S4 defined as above, the first side shield 16C has the first and second sidewalls SW1 and SW2 defined as above, and the second side shield 16D has the third and fourth sidewalls SW3 and SW4 defined as above. In any cross section intersecting the first and third sidewalls SW1 and SW3 and parallel to the medium facing surface 80, the distance between the first sidewall SW1 and the third sidewall SW3 in the track width direction decreases with increasing proximity to the top surface 1a of the substrate 1, and the distance between the first side surface S1 and the third side surface S3 in the track width direction decreases with increasing proximity to the top surface 1a of the substrate 1. By virtue of this, the present embodiment makes it possible to prevent the occurrence of unwanted erasure induced by a skew. The skew refers to a tilt of a magnetic head with respect to the tangent of the circular track, the tilt occurring depending on the position of the magnetic head along the direction across the tracks.

In the present embodiment, the side shield height SH shown in FIG. 4 is equal to the distance from each of the top edges E1U and E2U to the medium facing surface 80, the top edges E1U and E2U being the edges of the second and fourth sidewalls SW2 and SW4 that are farthest from the top surface 1a of the substrate 1. The position of the top edges E1U and E2U is defined by the second etching step shown in FIG. 22A and FIG. 22B. The position of the top edges E1U and E2U can be selected as desired, independently of the track width of the main pole 13, by the amount of etching in the second etching step. According to the present embodiment, it is thus possible to provide a small side shield height SH while reducing the track width of the main pole 13 to a desired small value.

Now, a manufacturing method for a magnetic head of a comparative example will be considered. The manufacturing method for the magnetic head of the comparative example includes, instead of the first and second etching steps of the present embodiment, only a step of etching a portion of each of the first initial side shield 16CP and the second initial side shield DP so as to provide the first initial side shield 16CP with the second sidewall SW2 and provide the second initial side shield 16DP with the fourth sidewall SW4. In the comparative example, the position of the top edges E1U and E2U is defined by the position of the wall face 85a of the mask 85. In the comparative example, the side shield height SH can be reduced by bringing the position of the wall face 85a of the mask 85 closer to the positon ABS at which the medium facing surface 80 is to be formed.

In the comparative example, the side shield height SH can be reduced also by increasing the amount of polishing in the step of forming the medium facing surface 80. However, in the comparative example, due to the limit of accuracy of photolithography in the step of forming the first resist layer 81 (see FIG. 10), a portion of the first initial side shield 16CP near the boundary between the first sidewall SW1 and the seventh sidewall and a portion of the second initial side shield 16DP near the boundary between the third sidewall SW3 and the eighth sidewall are shaped with rounded corners. Accordingly, in the comparative example, it is difficult to accurately form a portion of the first sidewall SW1 near the second sidewall SW2 and a portion of the third sidewall SW3 near the fourth sidewall SW4, and to reduce the distance between these two portions. Therefore, in the comparative example, if the amount of polishing is increased to reduce the side shield height SH, a portion of the first sidewall SW2 distant from the second sidewall SW2 and a portion of the third sidewall SW3 distant from the fourth sidewall SW4 are removed whereas the portion of the first sidewall SW1 near the second sidewall SW2 and the portion of the third sidewall SW3 near the fourth sidewall SW4 remain, which results in poor accuracy of the first and third sidewalls SW1 and SW3 and a large distance between the first sidewall SW1 and the third sidewall SW3 in the track width direction.

In contrast, according to the present embodiment, by increasing the amount of etching in the second etching step, it is possible to remove low accuracy portions of the first and third sidewalls SW1 and SW3 while allowing high accuracy portions of the first and third sidewalls SW1 and SW3, which are respective portions distant from the second and fourth sidewalls SW2 and SW4, to remain. The present embodiment thus makes it possible to reduce the side shield height SH while allowing the high accuracy portions of the first and third sidewalls SW1 and SW3 to remain. The present embodiment further makes it possible to accurately define the position of the second and fourth sidewalls SW2 and SW4 by the second etching step. Consequently, according to the present embodiment, it is possible to achieve reduction of the side shield height SH and accurate definition of the first to fourth sidewalls SW1 to SW4 at the same time.

Here, the distance from the boundary between the front portion 15A and the rear portion 15B on the top surface 13T of the main pole 13 to the medium facing surface 80, in other words, the length of the front portion 15A in a direction perpendicular to the medium facing surface 80, is defined as the neck height. According to the present embodiment, it is possible to reduce the neck height by reducing the side shield height SH. The present embodiment thus enables sufficient increase in the cross-sectional area of the main pole 13 in the vicinity of the medium facing surface 80.

Further, in the present embodiment, the bottom Ra of the receiving section R includes the first inclined portion Ra1 and the second inclined portion Ra2, and the bottom end 13L of the main pole 13 includes the first portion 13L1 opposed to the first inclined portion Ra1, and the second portion 13L2 opposed to the second inclined portion Ra2. The second inclined portion Ra2 is inclined with respect to the first inclined portion Ra1 such that an angle that the second inclined portion Ra2 forms with respect to the top surface 1a of the substrate 1 is greater than an angle that the first inclined portion Ra1 forms with respect to the top surface 1a of the substrate 1. By virtue of this, the present embodiment provides a larger cross-sectional area of the main pole 13 in the vicinity of the medium facing surface 80 than in the case without the second inclined portion Ra2 and the second portion 13L2.

In the present embodiment, the side shield height SH is approximately equal to the distance from each of the bottom edges E1L and E2L of the second and fourth sidewalls SW2 and SW4 to the medium facing surface 80 and the distance from the boundary Rb between the first inclined portion Ra1 and the second inclined portion Ra2 to the medium facing surface 80. Further, the distance from the boundary between the first portion 13L1 and the second portion 13L2 to the medium facing surface 80 is approximately equal to the distance from the boundary Rb to the medium facing surface 80 plus the thickness of the first gap layer 18. Thus, according to the present embodiment, reducing the side shield height SH as described above enables a reduction in the distance from the boundary between the first portion 13L1 and the second portion 13L2 to the medium facing surface 80. The boundary between the first portion 13L1 and the second portion 13L2 coincides with the third end 14a1 of the front end face 14a of the lower protrusion 14. According to the present embodiment, by reducing the distance from the boundary between the first portion 13L1 and the second portion 13L2 to the medium facing surface 80, it is possible to bring the lower protrusion 14 closer to the medium facing surface 80 to thereby achieve a further increase in the cross-sectional area of the main pole 13 in the vicinity of the medium facing surface 80.

In the present embodiment, the bottom Ra of the receiving section R further includes the third inclined portion Ra3. The second inclined portion Ra2 and the third inclined portion Ra3 are formed in the top surface 16APb of the initial bottom shield 16AP by the second etching step. The third inclined portion Ra3 is inclined with respect to the second inclined portion Ra2 such that an angle that the third inclined portion Ra3 forms with respect to the top surface 1a of the substrate 1 is smaller than the angle that the second inclined portion Ra2 forms with respect to the top surface 1a of the substrate 1. By virtue of this, the present embodiment allows the bottom shield 16A to have a greater volume than in the case without the third inclined portion Ra3. The present embodiment thereby makes it possible to prevent the occurrence of magnetic flux saturation in the bottom shield 16A and to make full use of the function of the bottom shield 16A. As a result, a higher track density is achieved by the present embodiment.

By virtue of the foregoing, the present embodiment achieves improved write characteristics and higher recording density at the same time.

Second Embodiment

A manufacturing method for a magnetic head according to a second embodiment of the invention will now be described with reference to FIG. 24A to FIG. 26B. FIG. 24A to FIG. 26B each illustrate a stack of layers formed in the process of manufacturing the magnetic head. FIG. 24A to FIG. 26B omit the illustration of portions that are closer to the substrate 1 relative to the initial bottom shield 16AP and the initial nonmagnetic layer 55P.

Fig. nA (n is an integer between 24 and 26 inclusive) shows a cross section perpendicular to the medium facing surface 80 and to the top surface 1a of the substrate 1, the cross section intersecting the second sidewall SW2 and the recessed portions 16Ac and 55b to be formed later. Fig. nB shows a cross section perpendicular to the medium facing surface 80 and to the top surface 1a of the substrate 1, the cross section intersecting the end face 13a (see FIG. 1 to FIG. 4) of the main pole 13 to be formed later. In each of FIG. 24A to FIG. 26B, the symbol "ABS" indicates the position at which the medium facing surface 80 is to be formed.

Figure 24A:
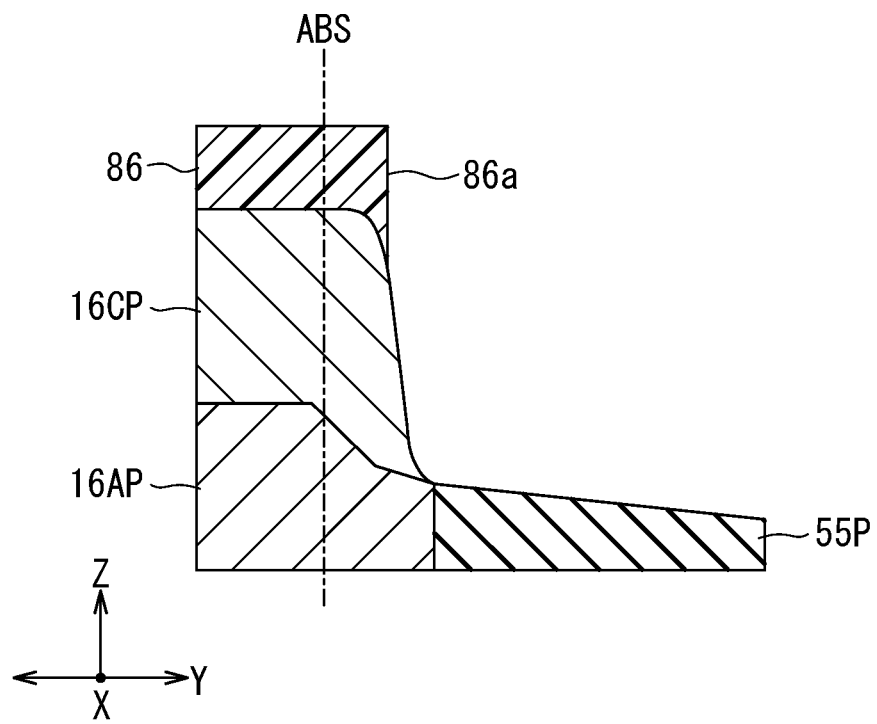
FIG. 24A and FIG. 24B are cross-sectional views showing a step of a manufacturing method for a magnetic head according to a second embodiment of the invention.
Figure 24B:
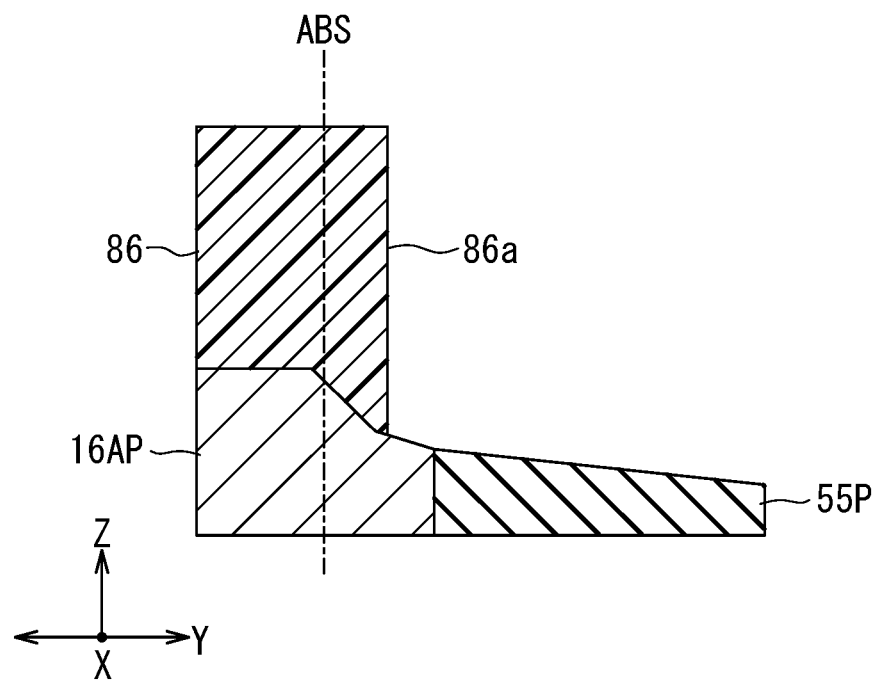

The manufacturing method for the magnetic head according to the present embodiment is the same as the method according to the first embodiment up to the step shown in FIG. 12 for the first embodiment, that is, the step of forming the first and second initial side shields 16CP and 16DP and removing the second resist layer 83 and the separating film 82. FIG. 24A and FIG. 24B show a step following the removal of the second resist layer 83 and the separating film 82. In this step, a mask 86 is formed over the initial bottom shield 16AP, the first initial side shield 16CP and the second initial side shield 16DP. The mask 86 is formed by patterning a photoresist layer by photolithography, for example.

The mask 86 covers the first and second pre-side-shield portions 16CP1 and 16DP1 (see FIG. 12) of the first and second initial side shields 16CP and 16DP. The mask 86 has a wall face 86a including a portion that defines the position of each of the initial second sidewall SW2P and the initial fourth sidewall SW4P.

Figure 25A:
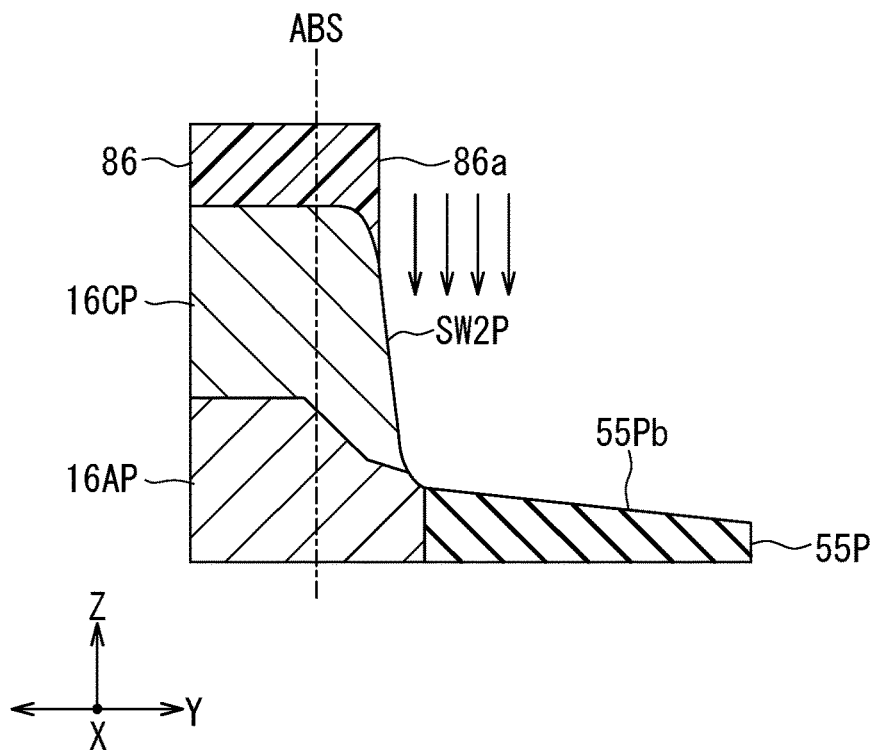
FIG. 25A and FIG. 25B are cross-sectional views showing a step that follows the step shown in FIG. 24A and FIG. 24B.
Figure 25B:
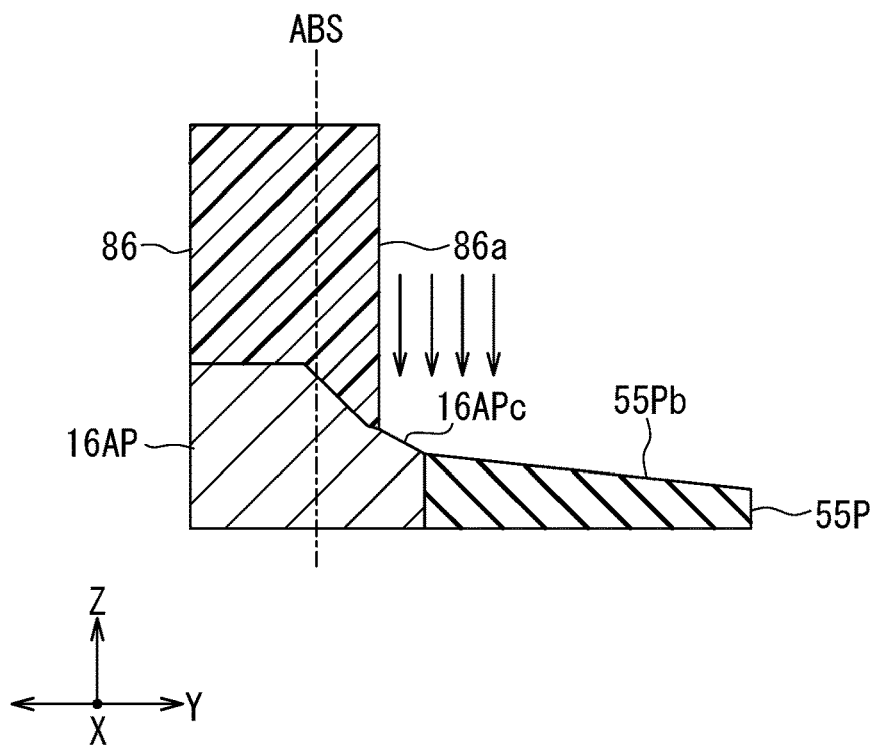

FIG. 25A and FIG. 25B show the next step. In this step, performed is the first etching step which has been described in relation to the first embodiment. In the present embodiment, a portion of each of the first initial side shield 16CP and the second initial side shield 16DP is etched using the mask 86. As a result of the first etching step, the first initial side shield 16CP is provided with the initial second sidewall SW2P, and the second initial side shield 16DP is provided with the initial fourth sidewall SW4P. The first etching step further provides the top surface of the initial bottom shield 16AP with the initial receiving section 16APc, and provides the top surface of the initial nonmagnetic layer 55P with the initial recessed portion 55Pb.

As in the first embodiment, the first etching step is performed by ME. The arrows in FIG. 25A and FIG. 25B indicate the direction of travel of ions in plasma.

Figure 26A:
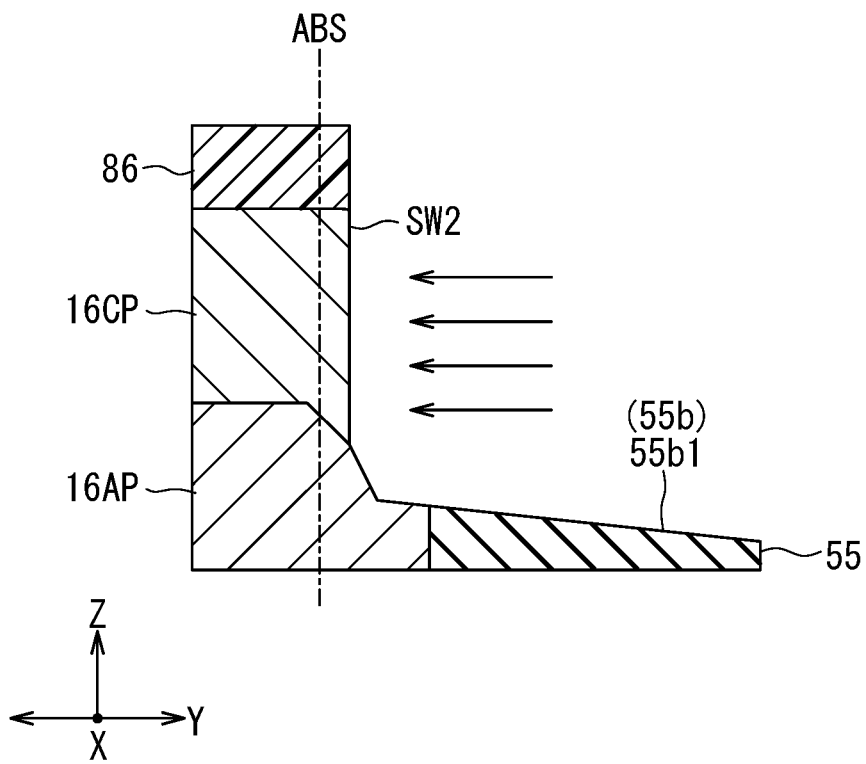
FIG. 26A and FIG. 26B are cross-sectional views showing a step that follows the step shown in FIG. 25A and FIG. 25B.
Figure 26B:
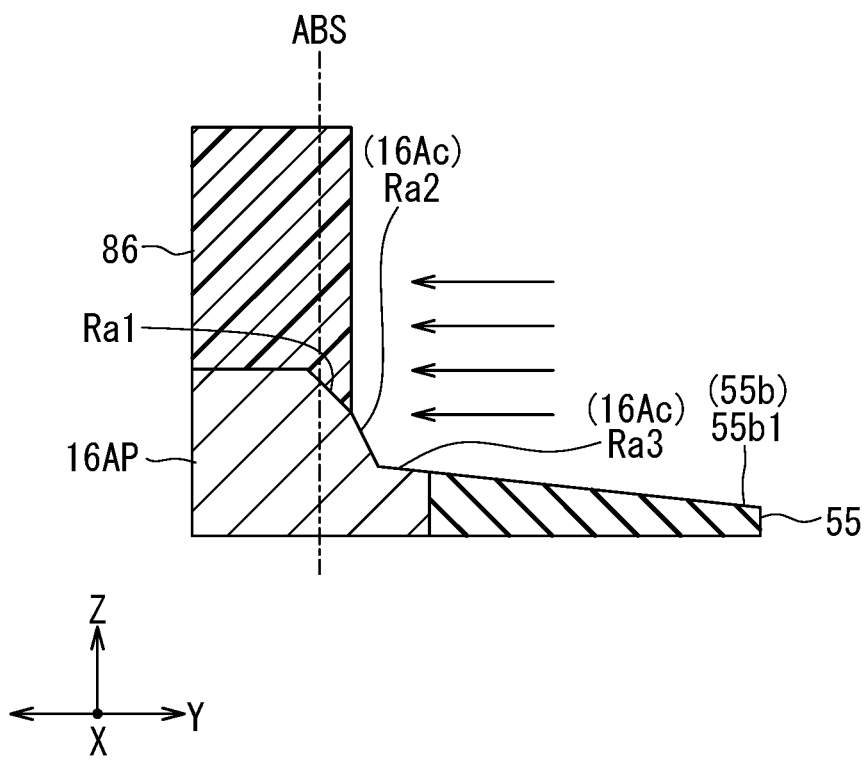

FIG. 26A and FIG. 26B show the next step. In this step, performed is the second etching step which has been described in relation to the first embodiment. The second etching step etches a portion of each of the first initial side shield 16CP, the second initial side shield 16DP and the initial bottom shield 16AP. As a result of the second etching step, the initial second sidewall SW2P becomes the second sidewall SW2, and the initial fourth sidewall SW4P becomes the fourth sidewall SW4. Further, the second etching step provides the top surface of the initial bottom shield 16AP with the second and third inclined portions Ra2 and Ra3. This makes the initial recessed portion 16APc into the recessed portion 16Ac. Further, the second etching step etches a portion of the initial nonmagnetic layer 55P. This makes the initial recessed portion 55Pb into the recessed portion 55b, thus making the initial nonmagnetic layer 55P into the nonmagnetic layer 55.

As in the first embodiment, the second etching step is performed by IBE. The arrows in FIG. 26A and FIG. 26B indicate the direction of travel of ion beams.

After the second etching step, the mask 86 is removed. The subsequent steps are the same as those in the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the shapes of the main pole 13, the bottom shield 16A, the first side shield 16C and the second side shield 16D are not limited to the examples illustrated in the foregoing embodiments but can be freely chosen. Note that if the dimension of the bottom shield 16A in a direction perpendicular to the medium facing surface 80 is smaller than in the example illustrated in the foregoing embodiments, the third inclined portion Ra3 may fail to be formed in the top surface 16APb of the initial bottom shield 16AP in the second etching step although the second inclined portion Ra2 is formed.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head comprising:
a medium facing surface configured to face a recording medium;
a coil configured to produce a magnetic field corresponding to data to be written on the recording medium;
a main pole configured to pass a magnetic flux corresponding to the magnetic field produced by the coil, and to produce a write magnetic field for writing the data on the recording medium;
a write shield formed of a magnetic material;
a gap section formed of a nonmagnetic material; and
a substrate having a top surface, wherein
the coil, the main pole, the write shield, and the gap section are disposed above the top surface of the substrate,
the write shield includes a bottom shield, a first side shield, and a second side shield,
the gap section is interposed between the main pole and each of the bottom shield, the first side shield and the second side shield,
the bottom shield has a top surface farthest from the top surface of the substrate,
the first and second side shields are located farther from the top surface of the substrate than the bottom shield, and are on opposite sides of the main pole in a track width direction,
the first side shield has a first front end face located in the medium facing surface, and a first sidewall and a second sidewall facing the main pole,
the first sidewall is connected to the first front end face,
the second sidewall is located farther from the medium facing surface than the first sidewall,
the second side shield has a second front end face located in the medium facing surface, and a third sidewall and a fourth sidewall facing the main pole,
the third sidewall is connected to the second front end face,
the fourth sidewall is located farther from the medium facing surface than the third sidewall,
each of the second and fourth sidewalls has a top edge farthest from the top surface of the substrate, and a bottom edge closest to the top surface of the substrate,
the top edge of each of the second and fourth sidewalls is substantially parallel to the medium facing surface,
the bottom shield and the first and second side shields are configured so that a portion of the top surface of the bottom shield, the first sidewall, and the third sidewall define a receiving section to receive a portion of the main pole,
the main pole has an end face located in the medium facing surface, a top surface farthest from the top surface of the substrate, a bottom end opposite to the top surface, and a first, a second, a third and a fourth side surface,
the first side surface is opposed to the first sidewall,
a portion of the second side surface is opposed to the second sidewall,
the third side surface is opposed to the third sidewall,
a portion of the fourth side surface is opposed to the fourth sidewall,
the receiving section has a bottom which is constituted by the portion of the top surface of the bottom shield and opposed to a portion of the bottom end of the main pole,
the bottom includes a first inclined portion, a second inclined portion, and a third inclined portion arranged in this order, the first inclined portion being closest to the medium facing surface,
the second inclined portion is located closer to the top surface of the substrate than the first inclined portion,
the third inclined portion is located closer to the top surface of the substrate than the second inclined portion,
a distance from the top surface of the substrate to any point on each of the first and third inclined portions decreases with increasing distance from the point to the medium facing surface,
the second inclined portion is inclined with respect to the first inclined portion such that an angle that the second inclined portion forms with respect to the top surface of the substrate is greater than an angle that the first inclined portion forms with respect to the top surface of the substrate,
the third inclined portion is inclined with respect to the second inclined portion such that an angle that the third inclined portion forms with respect to the top surface of the substrate is smaller than the angle that the second inclined portion forms with respect to the top surface of the substrate, and
the bottom end of the main pole includes a first portion opposed to the first inclined portion, a second portion opposed to the second inclined portion, and a third portion opposed to the third inclined portion.

2. The magnetic head according to claim 1, wherein the first portion is substantially parallel to the first inclined portion, the second portion is substantially parallel to the second inclined portion, and the third portion is substantially parallel to the third inclined portion.

3. The magnetic head according to claim 1, wherein a distance from the bottom edge of each of the second and fourth sidewalls to the medium facing surface is substantially equal to a distance from a boundary between the first and second inclined portions to the medium facing surface.

4. The magnetic head according to claim 3, wherein the distance from the bottom edge of each of the second and fourth sidewalls to the medium facing surface and the distance from the boundary between the first and second inclined portions to the medium facing surface fall within a range of 10 to 60 nm.

5. The magnetic head according to claim 1, wherein, in any cross section intersecting the first and third sidewalls and parallel to the medium facing surface, a distance between the first sidewall and the third sidewall in the track width direction decreases with increasing proximity to the top surface of the substrate, and a distance between the first side surface and the third side surface in the track width direction decreases with increasing proximity to the top surface of the substrate.

6. A manufacturing method for a magnetic head, the magnetic head comprising:
a medium facing surface configured to face a recording medium;
a coil configured to produce a magnetic field corresponding to data to be written on the recording medium;
a main pole configured to pass a magnetic flux corresponding to the magnetic field produced by the coil, and to produce a write magnetic field for writing the data on the recording medium;
a write shield formed of a magnetic material;
a gap section formed of a nonmagnetic material; and
a substrate having a top surface, wherein
the coil, the main pole, the write shield, and the gap section are disposed above the top surface of the substrate,
the write shield includes a bottom shield, a first side shield, and a second side shield,
the gap section is interposed between the main pole and each of the bottom shield, the first side shield and the second side shield,
the bottom shield has a top surface farthest from the top surface of the substrate,
the first and second side shields are located farther from the top surface of the substrate than the bottom shield, and are on opposite sides of the main pole in a track width direction,
the first side shield has a first front end face located in the medium facing surface, and a first sidewall and a second sidewall facing the main pole,
the first sidewall is connected to the first front end face,
the second sidewall is located farther from the medium facing surface than the first sidewall,
the second side shield has a second front end face located in the medium facing surface, and a third sidewall and a fourth sidewall facing the main pole,
the third sidewall is connected to the second front end face,
the fourth sidewall is located farther from the medium facing surface than the third sidewall,
each of the second and fourth sidewalls has a top edge farthest from the top surface of the substrate, and a bottom edge closest to the top surface of the substrate,
the top edge of each of the second and fourth sidewalls is substantially parallel to the medium facing surface,
the bottom shield and the first and second side shields are configured so that a portion of the top surface of the bottom shield, the first sidewall, and the third sidewall define a receiving section to receive a portion of the main pole,
the main pole has an end face located in the medium facing surface, a top surface farthest from the top surface of the substrate, a bottom end opposite to the top surface, and a first, a second, a third and a fourth side surface,
the first side surface is opposed to the first sidewall,
a portion of the second side surface is opposed to the second sidewall,
the third side surface is opposed to the third sidewall,
a portion of the fourth side surface is opposed to the fourth sidewall,
the receiving section has a bottom which is constituted by the portion of the top surface of the bottom shield and opposed to a portion of the bottom end of the main pole,
the bottom includes a first inclined portion and a second inclined portion arranged in this order, the first inclined portion being closer to the medium facing surface,
the second inclined portion is located closer to the top surface of the substrate than the first inclined portion,
a distance from the top surface of the substrate to any point on the first inclined portion decreases with increasing distance from the point to the medium facing surface,
the second inclined portion is inclined with respect to the first inclined portion such that an angle that the second inclined portion forms with respect to the top surface of the substrate is greater than an angle that the first inclined portion forms with respect to the top surface of the substrate, and
the bottom end of the main pole includes a first portion opposed to the first inclined portion, and a second portion opposed to the second inclined portion,
the manufacturing method comprising:
a step of forming an initial bottom shield having a top surface including the first inclined portion;
a step of forming a first initial side shield and a second initial side shield on the initial bottom shield, the first initial side shield having the first sidewall, the second initial side shield having the third sidewall;
a patterning step of patterning the first initial side shield, the second initial side shield and the initial bottom shield so as to provide the first initial side shield with the second sidewall, provide the second initial side shield with the fourth sidewall, and provide the top surface of the initial bottom shield with the second inclined portion;
a step of forming the gap section after the patterning step;
a step of forming an initial main pole after the step of forming the gap section;
a step of forming the coil; and
a step of forming the medium facing surface so that the initial bottom shield becomes the bottom shield, the first initial side shield becomes the first side shield, the second initial side shield becomes the second side shield, and the initial main pole becomes the main pole, wherein the patterning step includes a first etching step and a second etching step, the first etching step etches a portion of each of the first initial side shield and the second initial side shield so as to provide the first initial side shield with an initial second sidewall and provide the second initial side shield with an initial fourth sidewall, and the second etching step etches a portion of each of the first initial side shield, the second initial side shield, and the initial bottom shield so as to make the initial second sidewall into the second sidewall, make the initial fourth sidewall into the fourth sidewall, and provide the top surface of the initial bottom shield with the second inclined portion.

7. The manufacturing method according to claim 6, wherein the bottom of the receiving section further includes a third inclined portion, the third inclined portion being located farther from the medium facing surface and closer to the top surface of the substrate than the second inclined portion, a distance from the top surface of the substrate to any point on the third inclined portion decreases with increasing distance from the point to the medium facing surface, the third inclined portion is inclined with respect to the second inclined portion such that an angle that the third inclined portion forms with respect to the top surface of the substrate is smaller than the angle that the second inclined portion forms with respect to the top surface of the substrate, the bottom end of the main pole further includes a third portion opposed to the third inclined portion, and the second etching step etches the portion of the initial bottom shield so as to provide the top surface of the initial bottom shield with the second and third inclined portions.

8. The manufacturing method according to claim 6, wherein the patterning step further includes:

a step of forming a planarization layer before the first etching step, the planarization layer covering a stack of layers including the first and second initial side shields; and a step of forming a mask on the planarization layer after the step of forming the planarization layer and before the first etching step, and the first etching step etches a portion of the planarization layer as well as the portion of each of the first initial side shield and the second initial side shield using the mask.

9. The manufacturing method according to claim 6, wherein the patterning step further includes a step of forming a mask on the first and second initial side shields before the first etching step, and the first etching step etches the portion of each of the first initial side shield and the second initial side shield using the mask.

10. The manufacturing method according to claim 6, wherein the first etching step is performed by reactive ion etching.

11. The manufacturing method according to claim 6, wherein the second etching step is performed by ion beam etching.

12. The manufacturing method according to claim 11, wherein the ion beam etching is performed such that ion beams are projected onto the initial second sidewall and the initial fourth sidewall.

* * * * *